United States Patent
Kim

(10) Patent No.: US 11,570,621 B2
(45) Date of Patent: Jan. 31, 2023

(54) V2X COMMUNICATION DEVICE AND SECURED COMMUNICATION METHOD THEREOF

(71) Applicant: LG Electronics Inc., Seoul (KR)

(72) Inventor: Soyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 493 days.

(21) Appl. No.: 16/618,225

(22) PCT Filed: Dec. 4, 2017

(86) PCT No.: PCT/KR2017/014084
§ 371 (c)(1),
(2) Date: Nov. 29, 2019

(87) PCT Pub. No.: WO2018/221805
PCT Pub. Date: Dec. 6, 2018

(65) Prior Publication Data
US 2020/0120505 A1      Apr. 16, 2020

Related U.S. Application Data

(60) Provisional application No. 62/512,168, filed on May 29, 2017.

(51) Int. Cl.
*H04L 29/06*      (2006.01)
*H04W 12/069*      (2021.01)
(Continued)

(52) U.S. Cl.
CPC ......... *H04W 12/069* (2021.01); *H04L 9/3268* (2013.01); *H04L 63/0823* (2013.01);
(Continued)

(58) Field of Classification Search
CPC ... H04W 12/069; H04W 4/44; H04W 12/062; H04W 4/06; H04L 9/3268; H04L 63/0823; H04L 2209/84
(Continued)

(56) References Cited

U.S. PATENT DOCUMENTS

| 10,484,351 | B2* | 11/2019 | Romansky | H04W 12/04 |
| 2014/0282983 | A1* | 9/2014 | Ju | H04W 12/068 726/8 |

(Continued)

FOREIGN PATENT DOCUMENTS

FR  3006836 A1 * 12/2014  ....... G08G 1/096783
KR  20120070369      6/2012
(Continued)

OTHER PUBLICATIONS

Laurens Hobert; Enhancements of V2X Communication in Support of Cooperative Autonomous DrivingIEEE:2015; pp. 1-12.*

(Continued)

*Primary Examiner* — Monjur Rahim
(74) *Attorney, Agent, or Firm* — Fish & Richardson P.C.

(57) ABSTRACT

Disclosed is a method for secured communication by a V2X communication device. A method for secured communication by a V2X communication device comprises the steps of: receiving a message on the basis of V2X communication; extracting adaptive certificate pre-distribution (ACPD) target information when the message includes the ACPD target information; pre-authenticating a short-term certificate; and transferring the pre-authenticated short-term certificate so that the pre-authenticated short-term certificate can be broadcasted at a predicted position.

10 Claims, 18 Drawing Sheets

(51) Int. Cl.
  *H04W 4/44* (2018.01)
  *H04L 9/32* (2006.01)
  *H04L 9/40* (2022.01)
  *H04W 4/06* (2009.01)
  *H04W 12/062* (2021.01)

(52) U.S. Cl.
  CPC ............... *H04W 4/06* (2013.01); *H04W 4/44* (2018.02); *H04W 12/062* (2021.01); *H04L 2209/84* (2013.01)

(58) Field of Classification Search
  USPC .......................................................... 713/156
  See application file for complete search history.

(56) References Cited

U.S. PATENT DOCUMENTS

| | | | | |
|---|---|---|---|---|
| 2016/0036558 | A1* | 2/2016 | Ibrahim | G08G 1/015 455/297 |
| 2016/0087804 | A1* | 3/2016 | Park | H04L 9/3268 713/156 |
| 2018/0205699 | A1* | 7/2018 | Weinfield | H04L 43/0823 |
| 2018/0217942 | A1* | 8/2018 | Fons | H04L 9/16 |

FOREIGN PATENT DOCUMENTS

| | | |
|---|---|---|
| KR | 20150079232 | 7/2015 |
| KR | 20160038091 | 4/2016 |
| WO | WO2014007516 | 1/2014 |

OTHER PUBLICATIONS

Adigun et al., "Protocol of change pseudonyms for VANETs," 38th Annual IEEE Conference on Local Computer Networks—Workshops, Oct. 21, 2013, 6 pages.

Extended European Search Report in European Appln. No. 17911798.1, dated Sep. 28, 2020, 9 pages.

Wasef et al., "DCS: An efficient distributed-certificate-service scheme for vehicular networks," IEEE Transactions on Vehicular Technology, Jul. 31, 2009, 59(2):533-549.

Zhu et al., "Security in service oriented vehicular networks," IEEE Wireless Communications, Oct. 9, 2009, 16(4):16-22.

PCT International Search Report in International Appln. No. PCT/KR207/014084, dated Dec. 4, 2017, 7 pages (with English translation).

Qualcomm Incorporated, "Solution for Application Layer Security for V2X Communication," S3-160578, 3GPP TSG SA WG3 (Security) Meeting #83, May 9-13, 2016 San Jose de los Cabos, Mexico, 4 pages.

* cited by examiner

[FIG. 1]
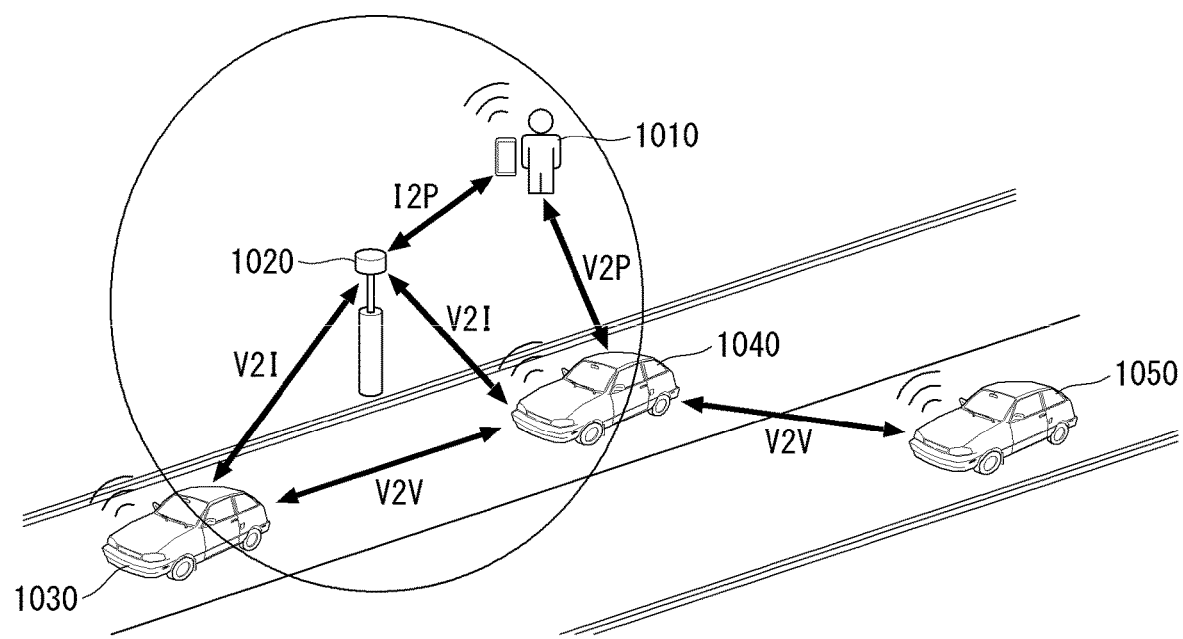

[FIG. 2]
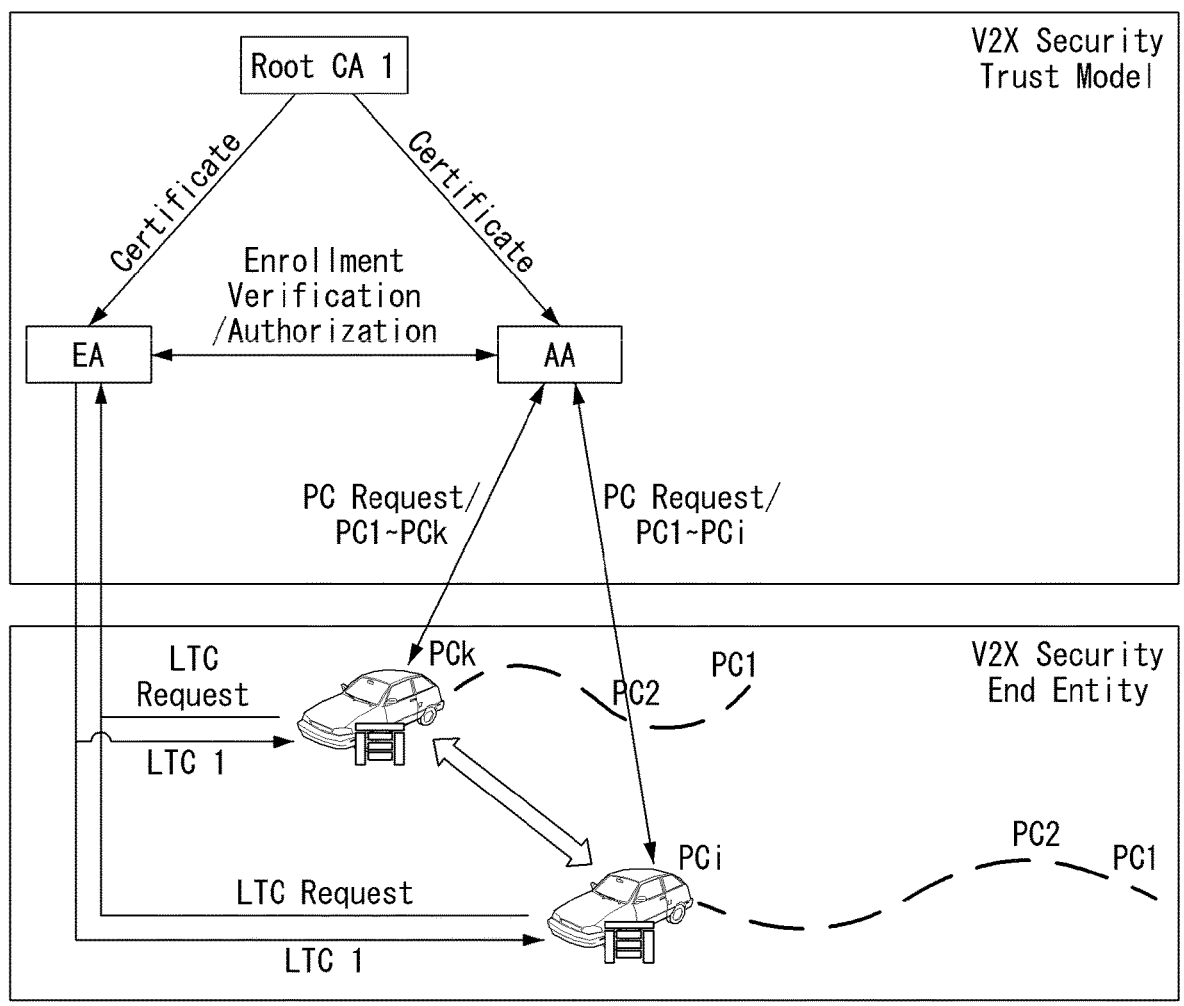

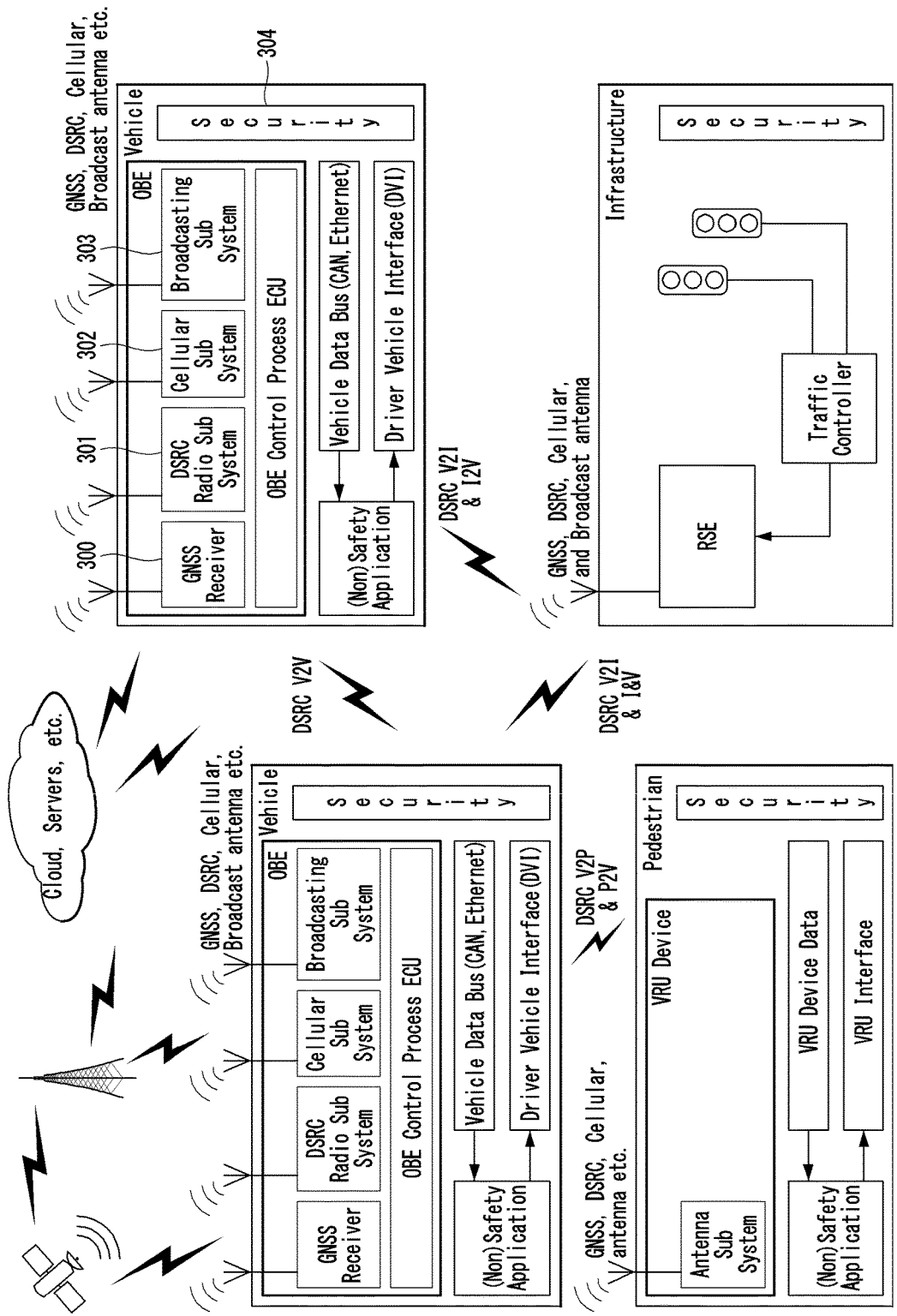
[FIG. 3]

[FIG. 4]
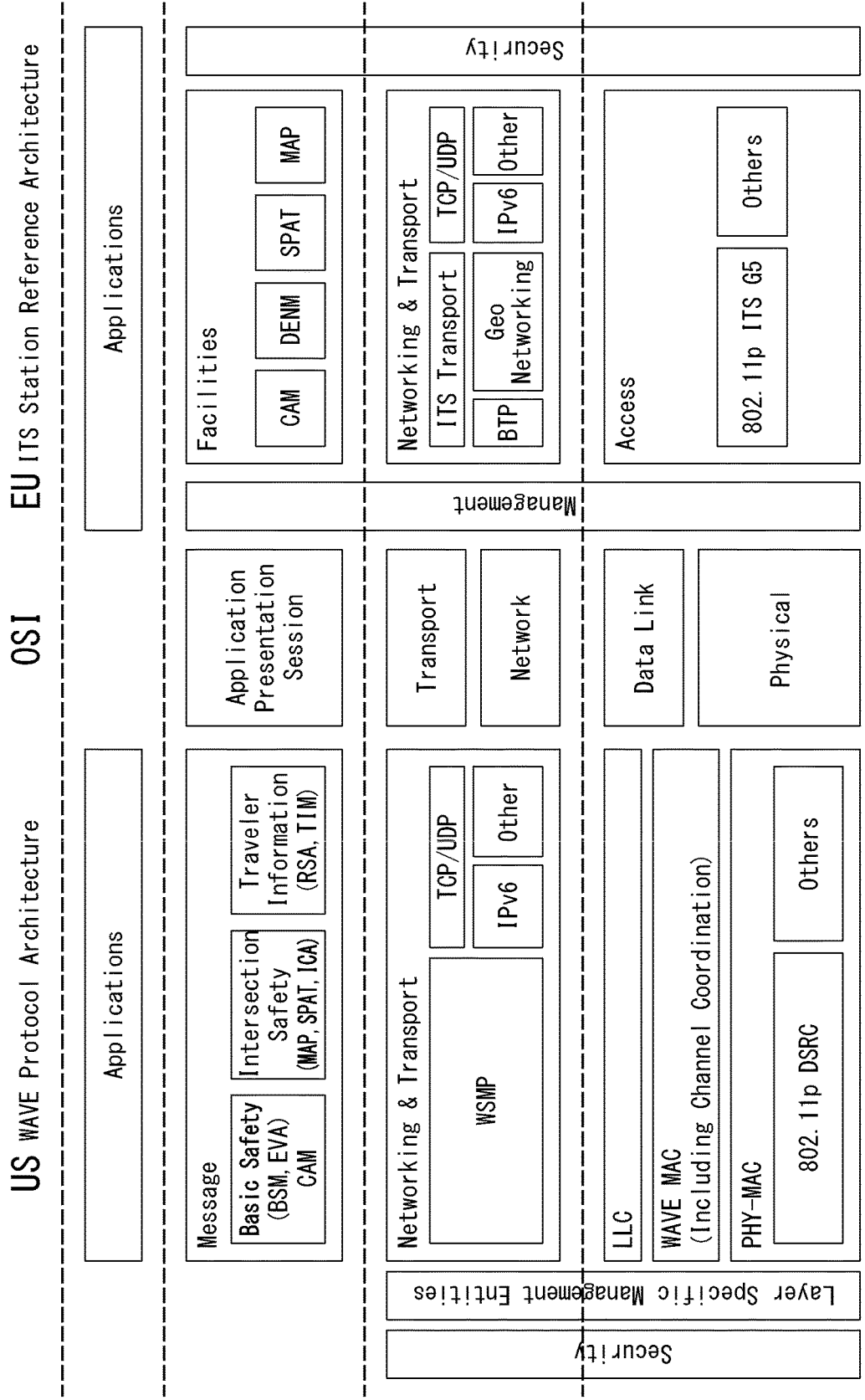

[FIG. 5]
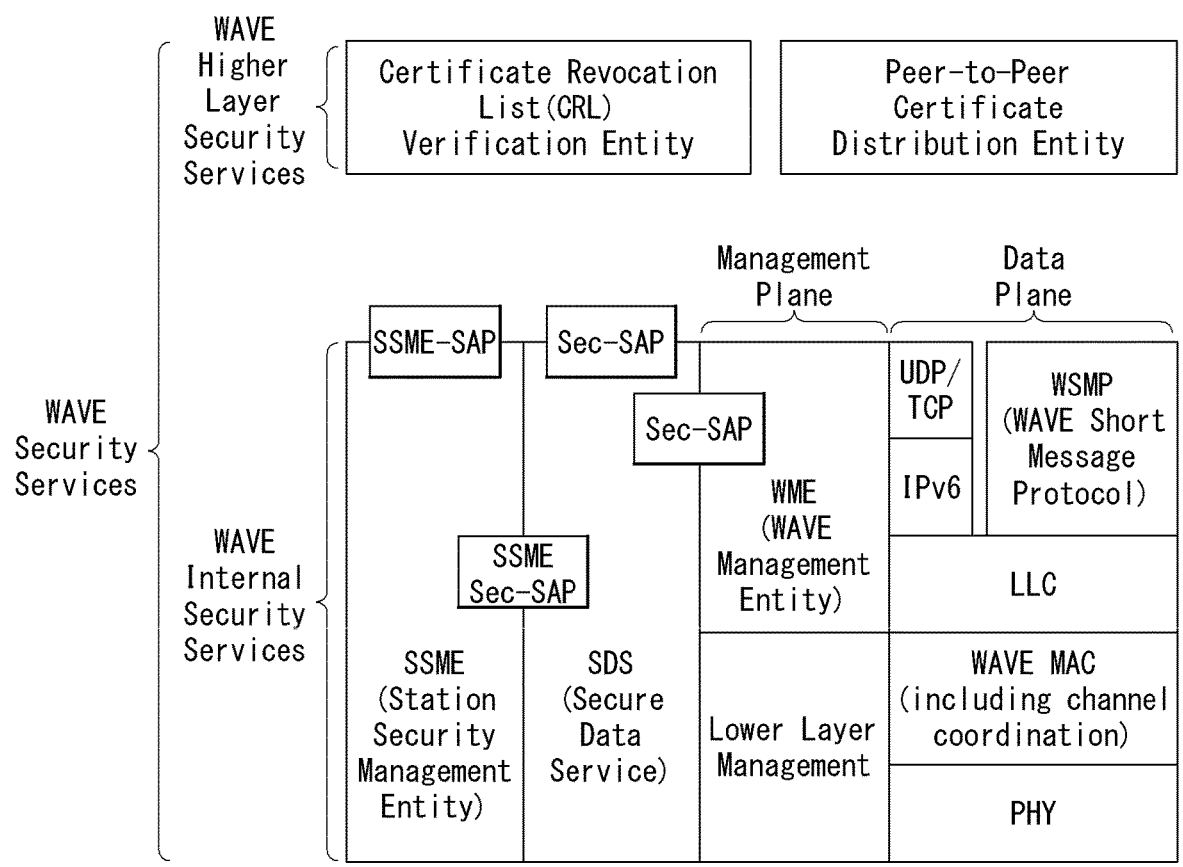

[FIG. 6]
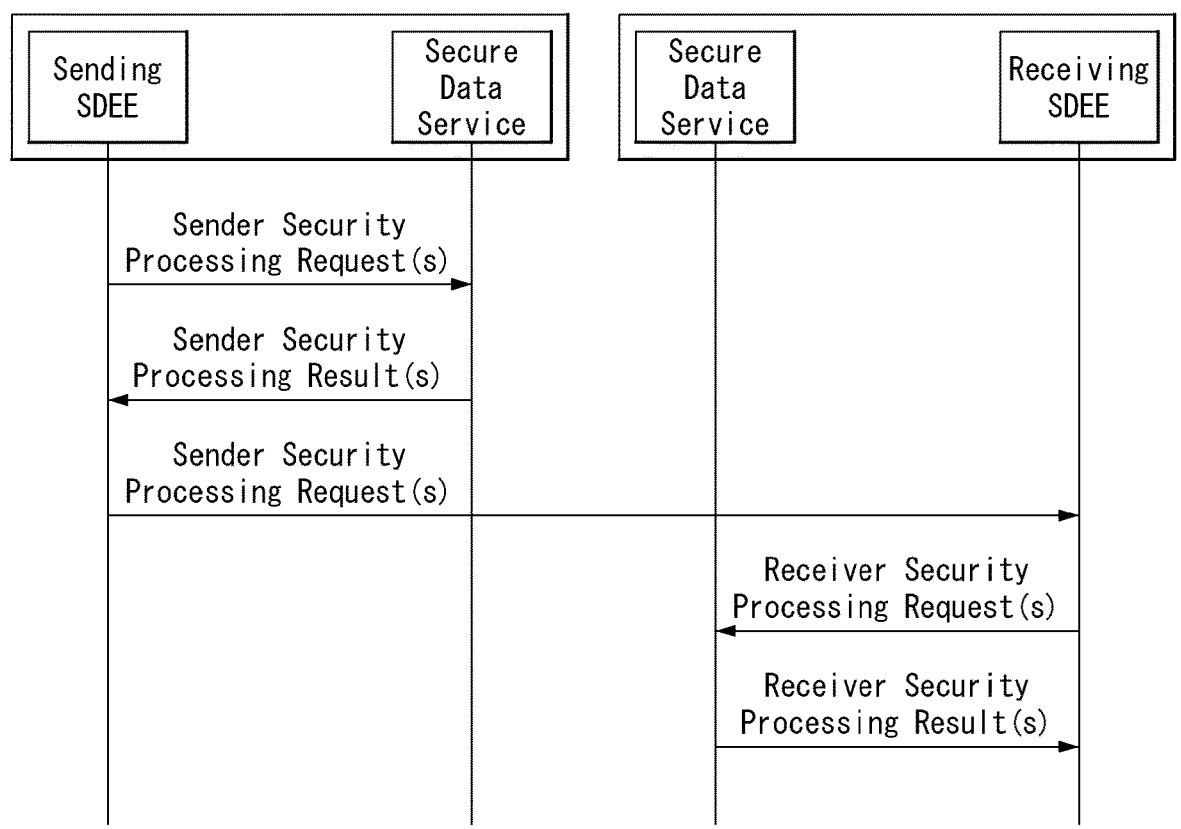

[FIG. 7]
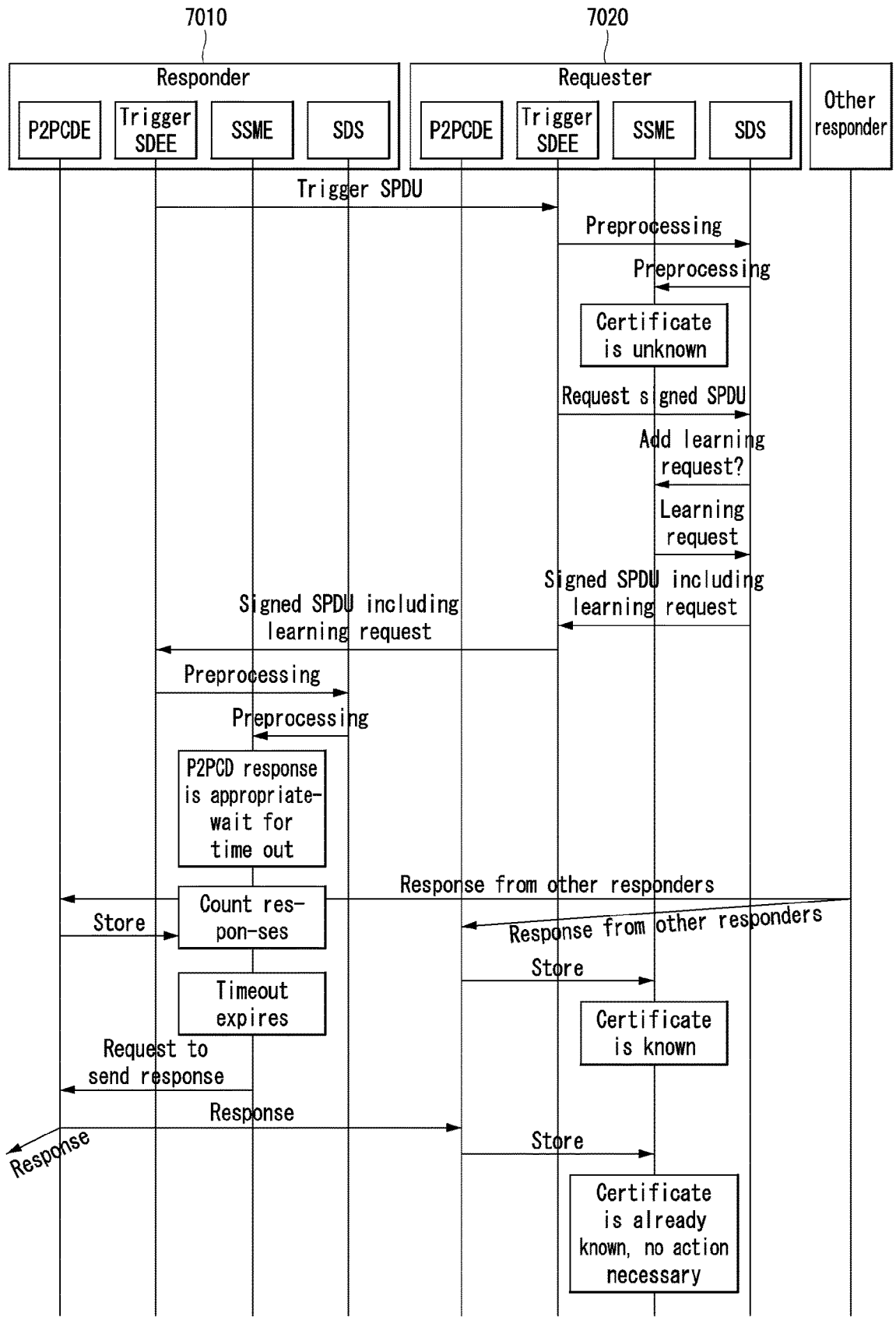

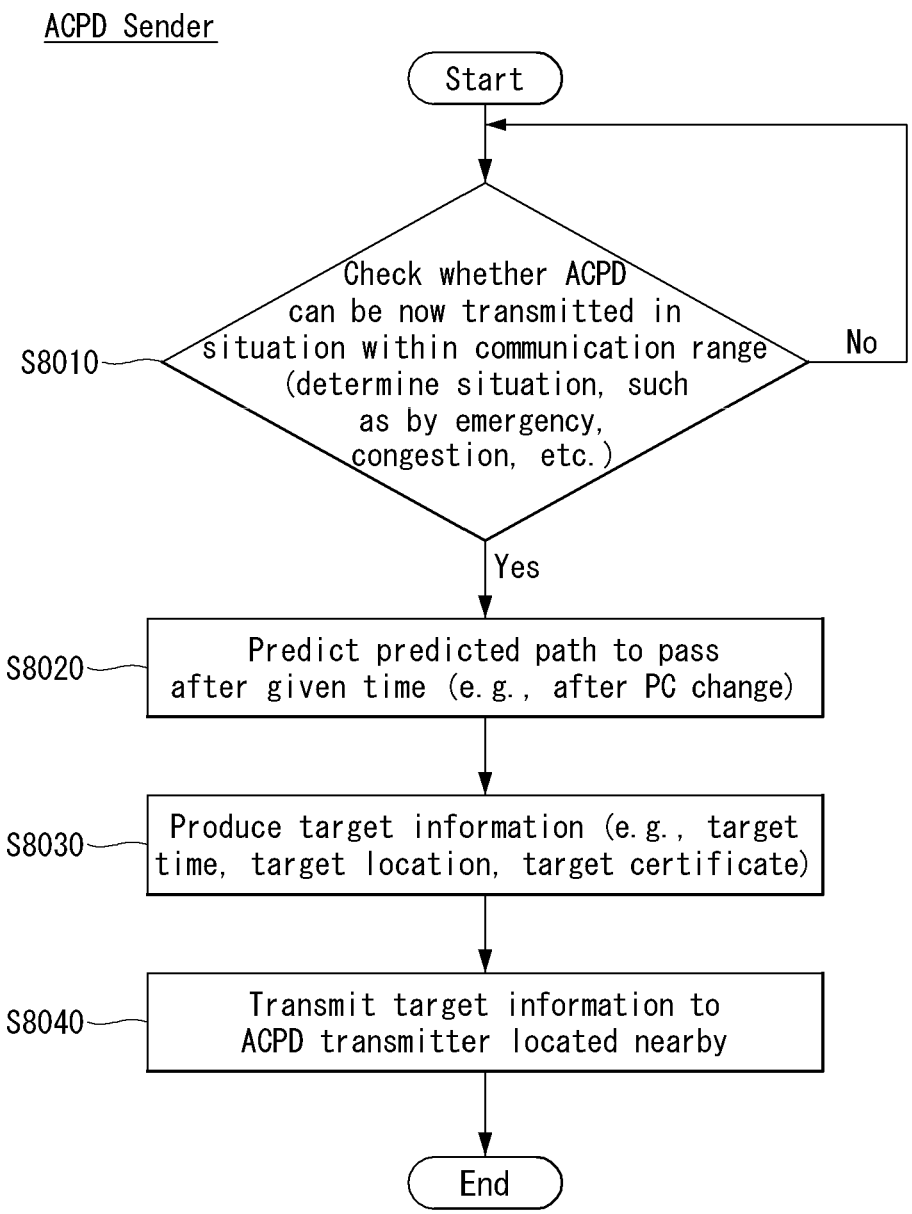

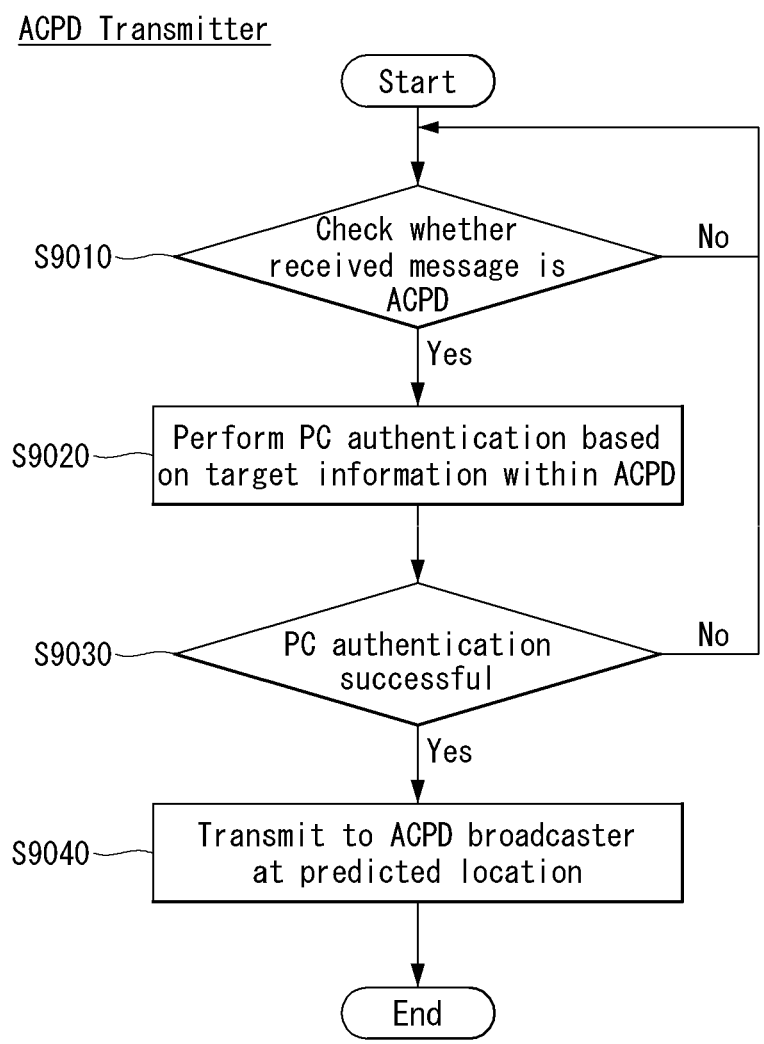

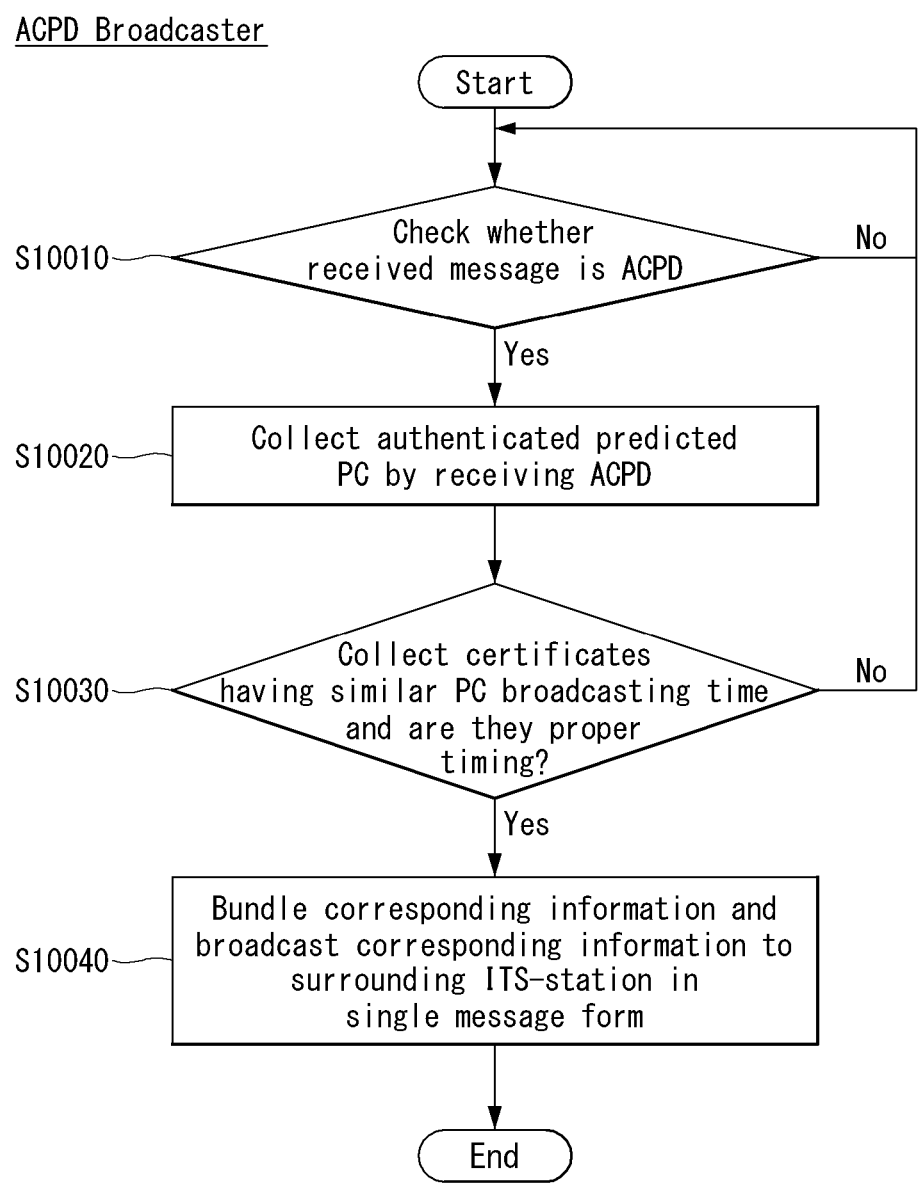
[FIG. 10]

[FIG. 11]
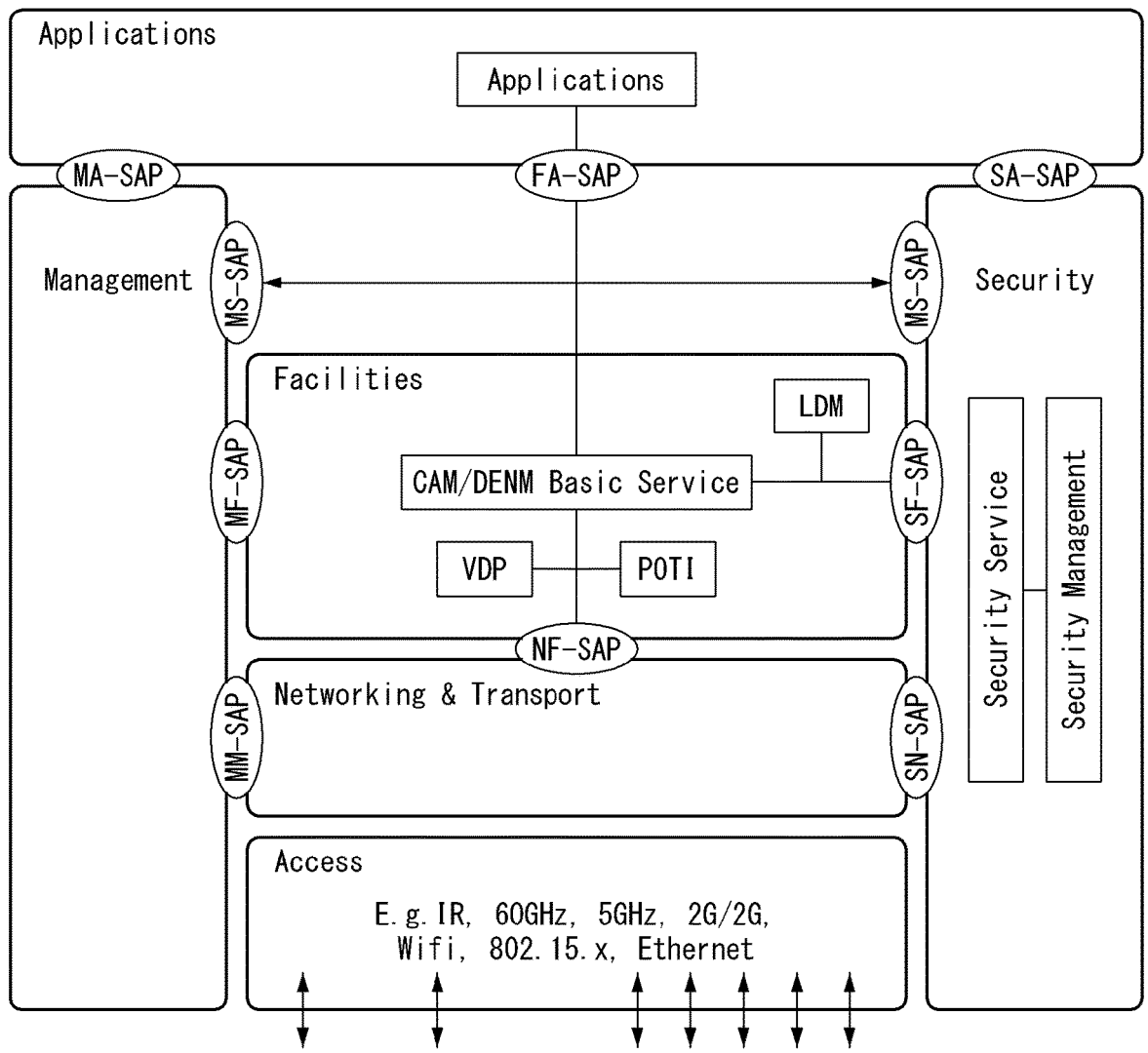

[FIG. 12]
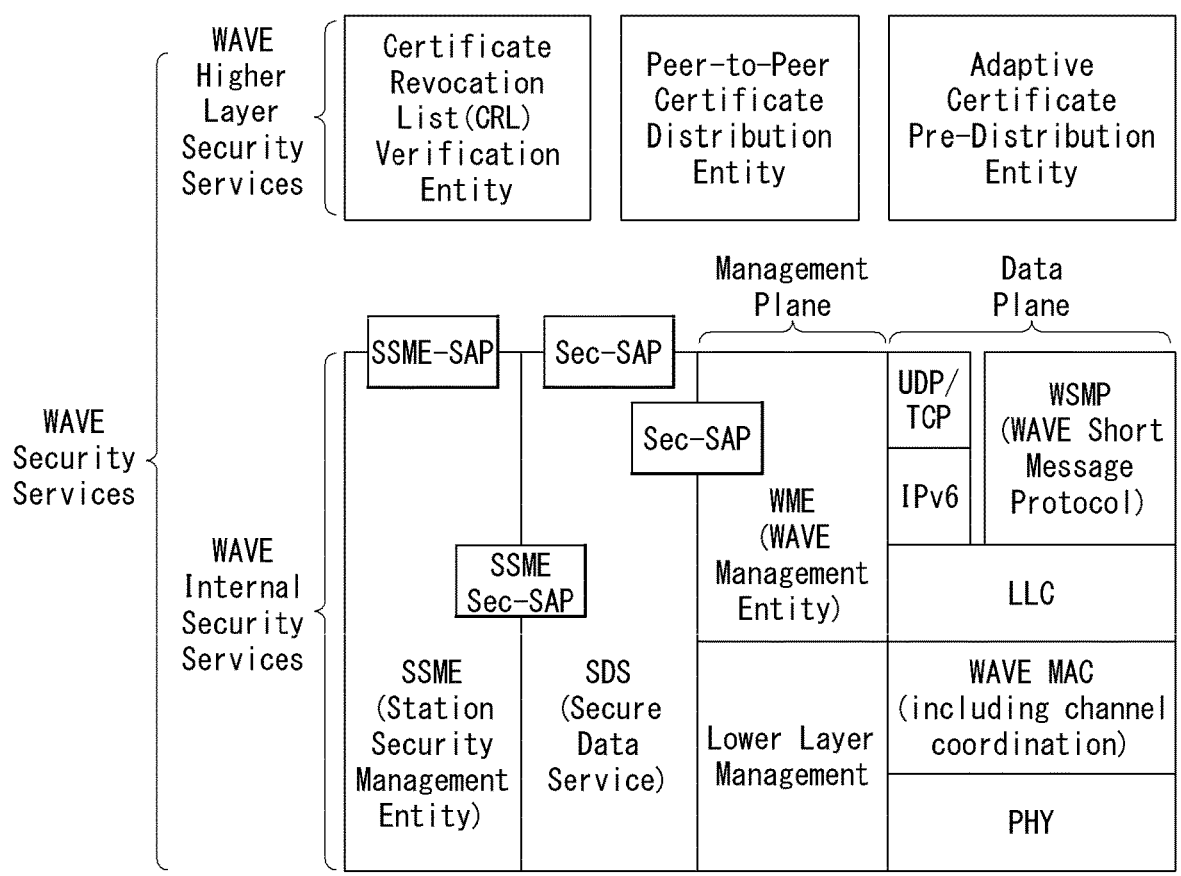

[FIG. 13]
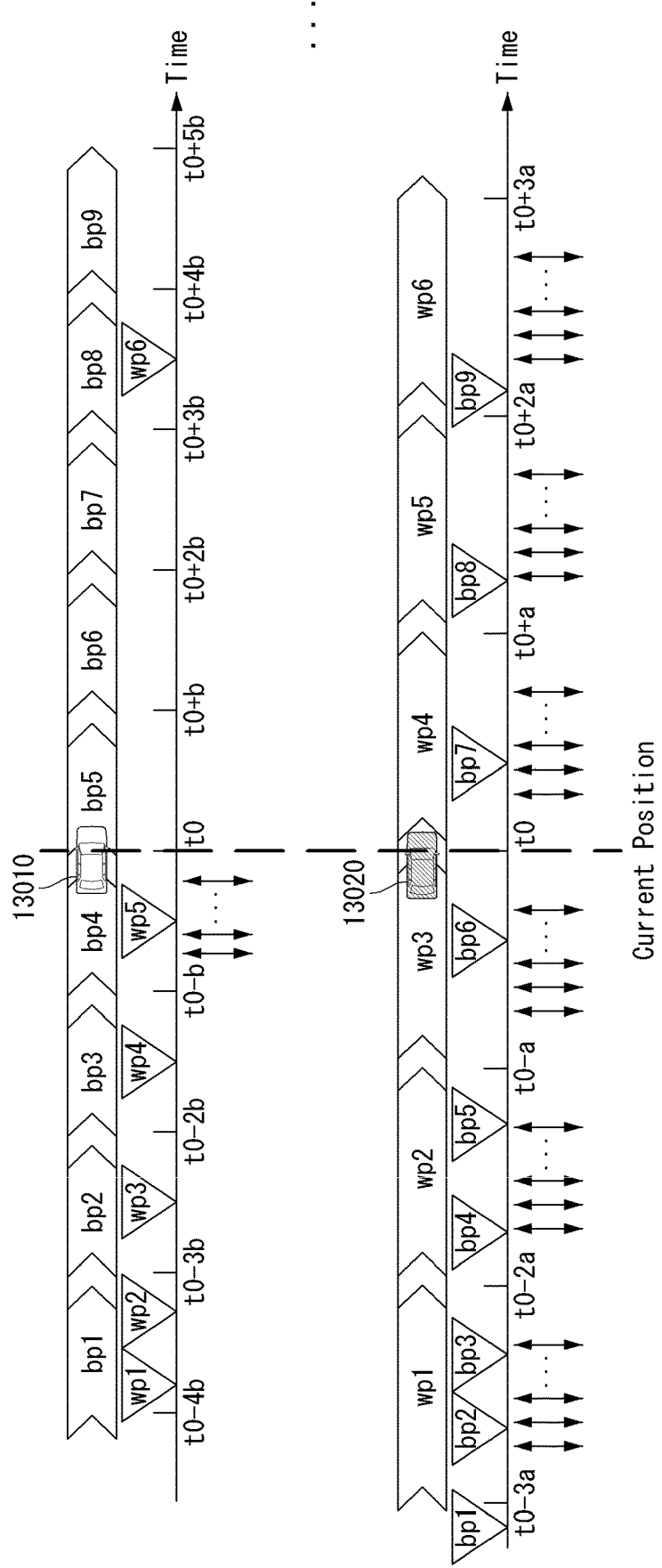

[FIG. 14]
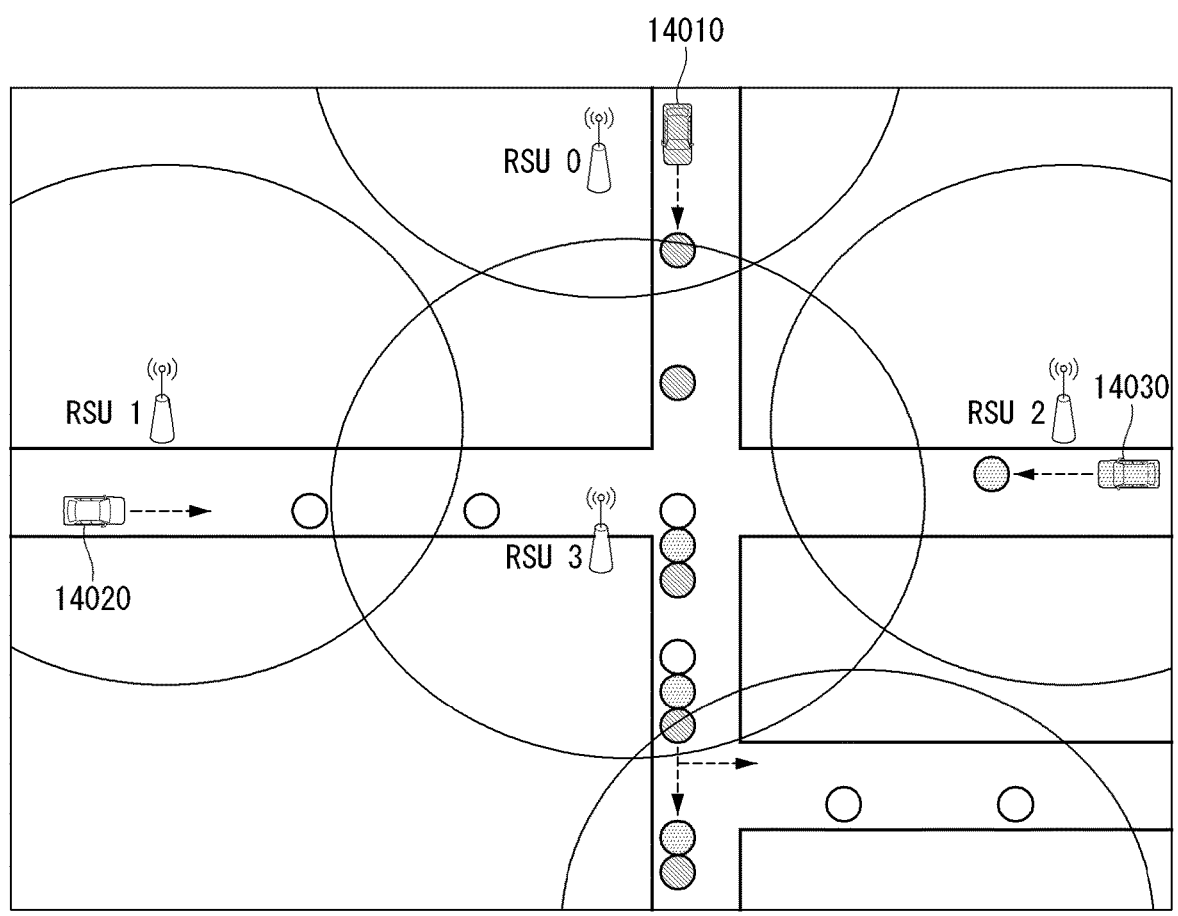

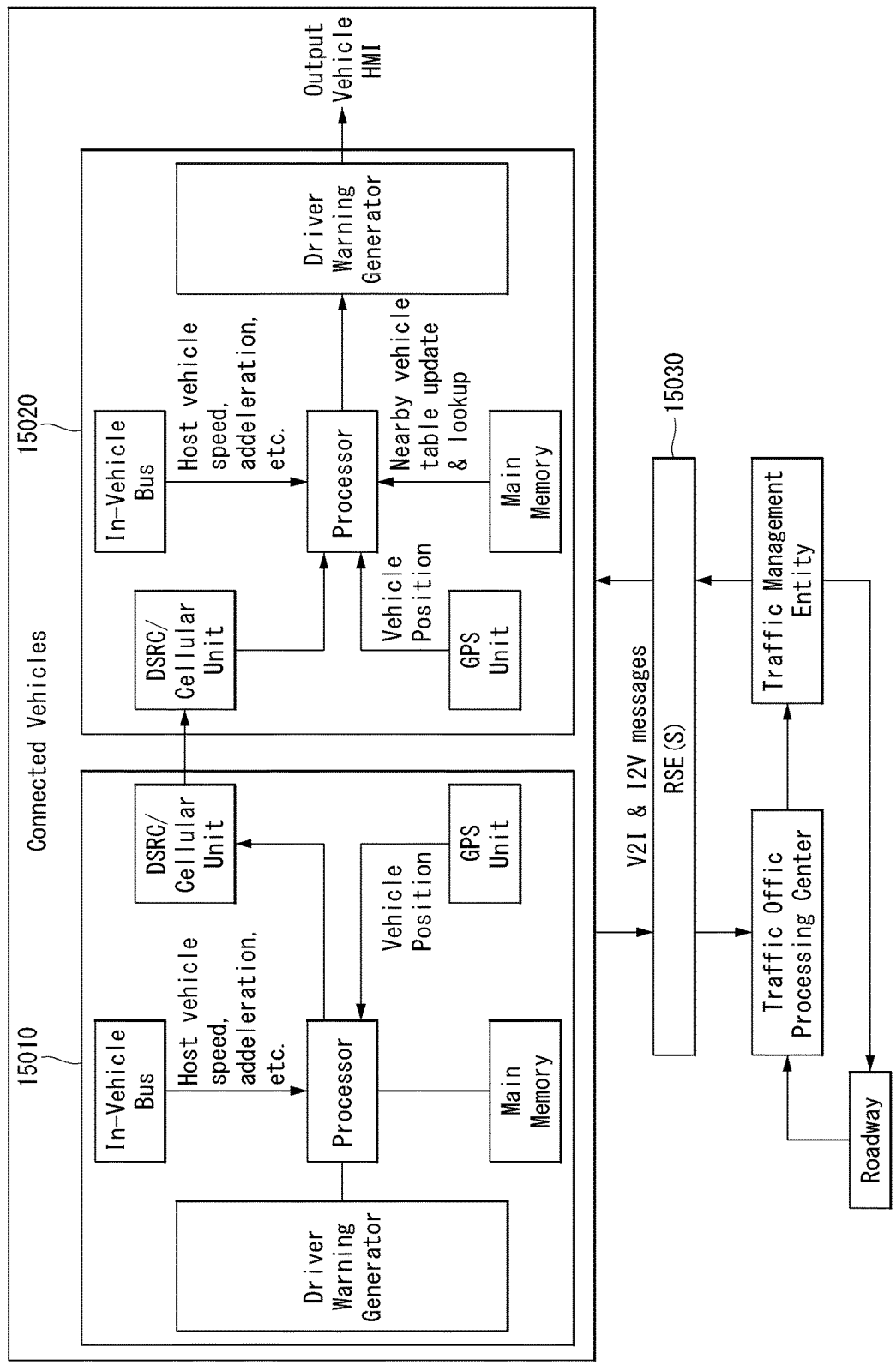

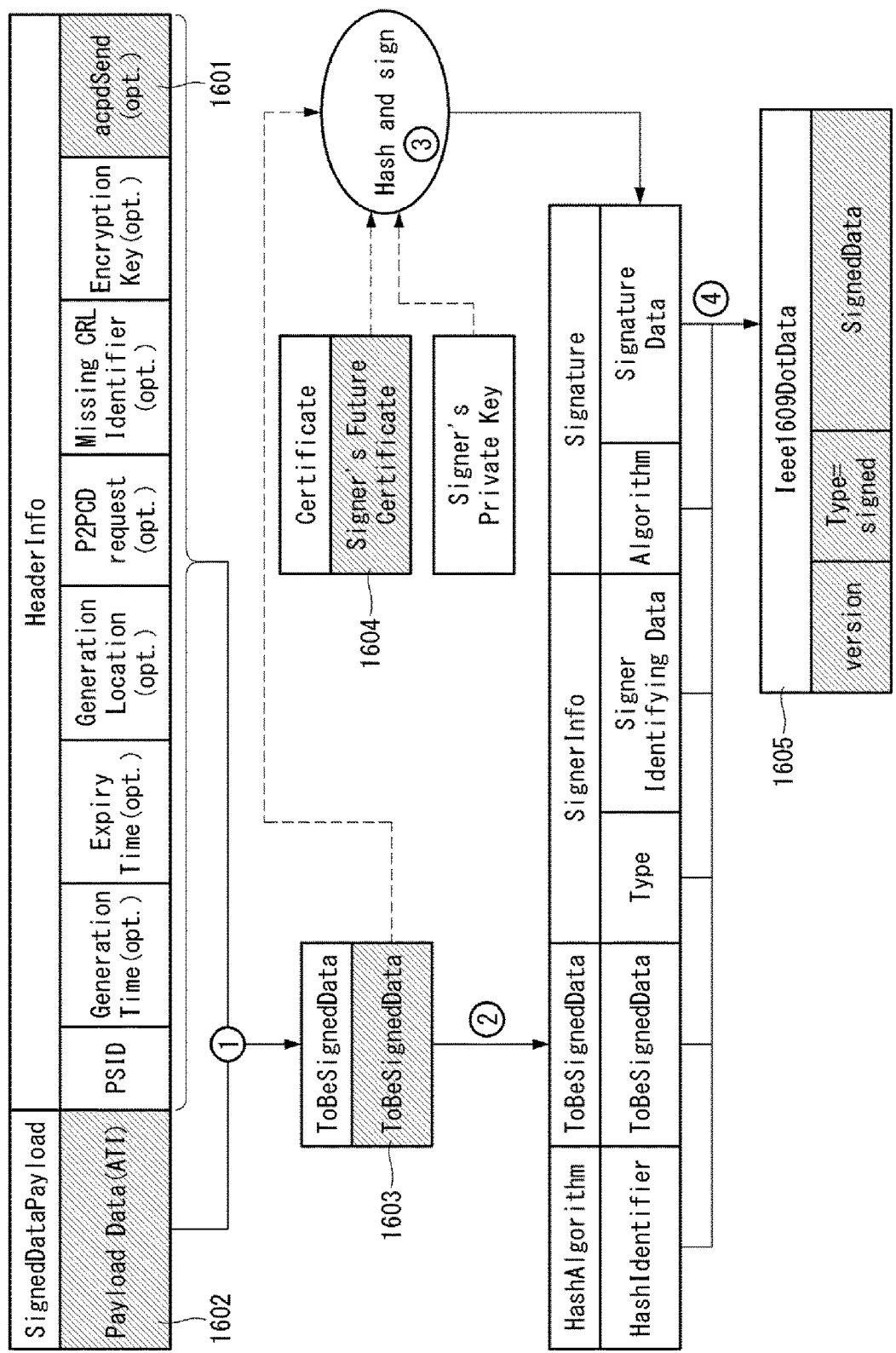
[FIG. 16]

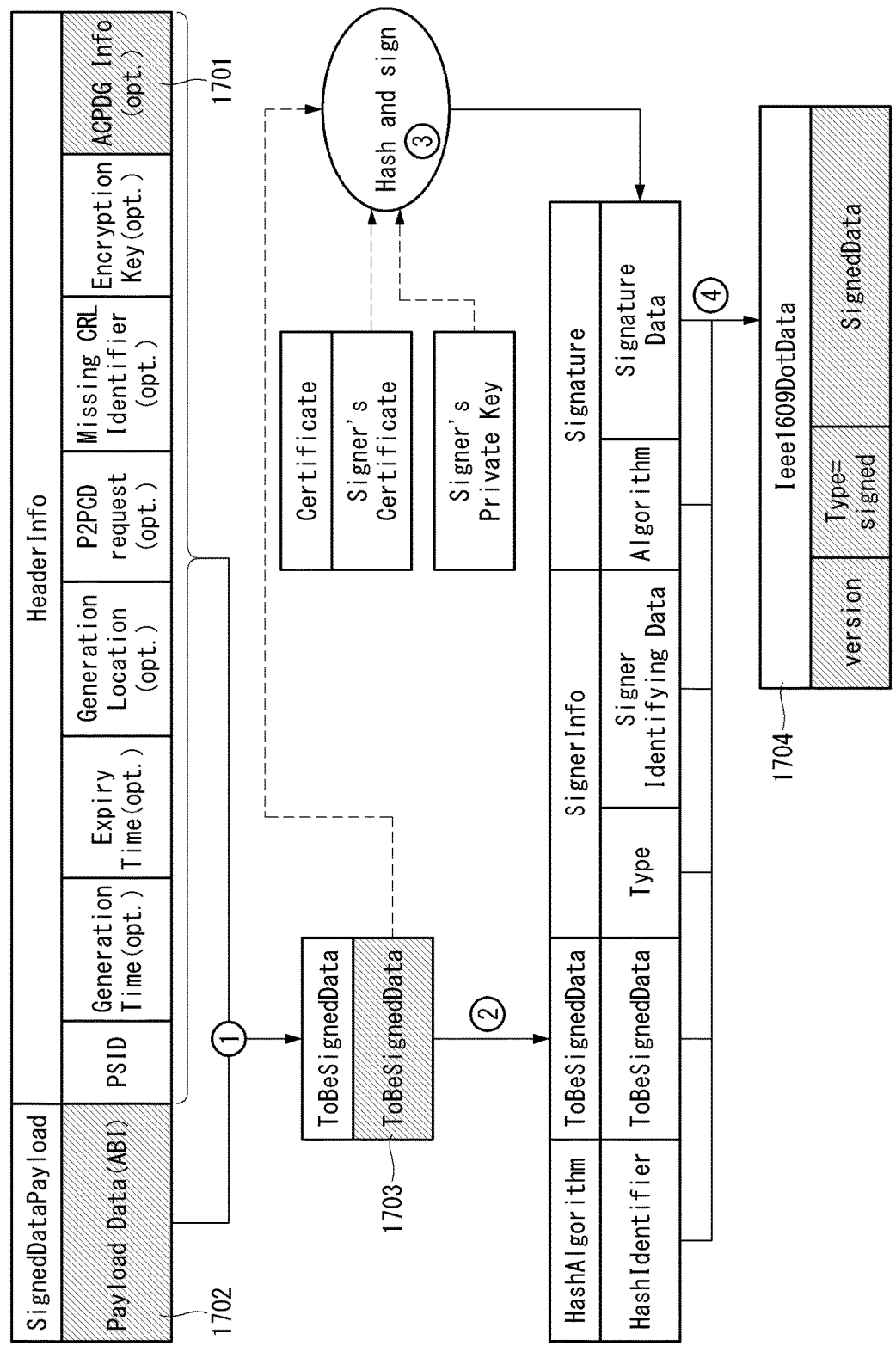
[FIG. 17]

[FIG. 18]
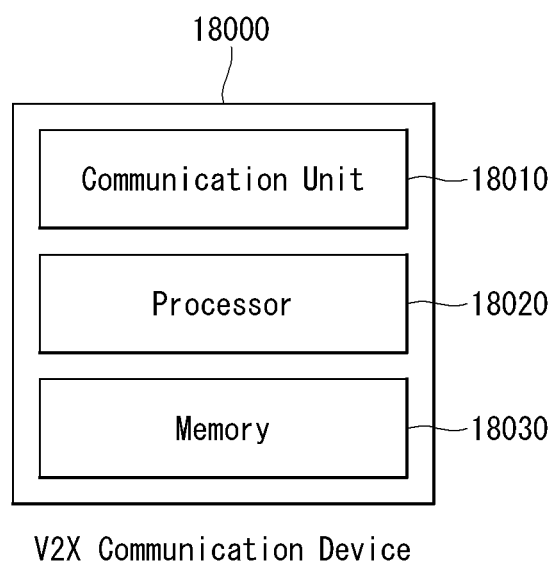
V2X Communication Device

V2X COMMUNICATION DEVICE AND SECURED COMMUNICATION METHOD THEREOF

CROSS-REFERENCE TO RELATED APPLICATIONS

This application is a National Stage application under 35 U.S.C. § 371 of International Application No. PCT/KR2017/014084, filed on Dec. 4, 2017, which claims the benefit of U.S. Provisional Application No. 62/512,168, filed on May 29, 2017. The disclosures of the prior applications are incorporated by reference in their entirety.

TECHNICAL FIELD

The disclosure relates to a device and secured communication method for V2X communication and, more particularly, to a communication method using a certificate for security and a secured communication method using a pre-authenticated certificate in addition to real-time authentication.

BACKGROUND ART

In recent years, a vehicle has become the result of the industrial convergence technology in which an electric technology, an electronic technology, and a communication technology are mixed, rather than the result of mechanical engineering technology. For this reason, the vehicle is also called a smart car. The smart car will provide not only a traditional vehicular technology, such as traffic safety and solving a traffic congestion, but also various user-customized transport services in the future by connecting a driver, a vehicle, a transport infrastructure, etc, one another. Such connectivity may be implemented using a vehicle-to-everything (V2X) communication technology. A system that provides the connectivity of a vehicle may also be referred to as a connected vehicle system.

DISCLOSURE

Technical Problem

As the connectivity of a vehicle is enhanced and increased, the amount and type of services, that is, a target of V2X communication, are also increasing. Furthermore, V2X communication requires low latency in order to improve the reliability and accuracy of a message. In contrast, an efficient V2X communication method is necessary because a channel is limited.

Technical Solution

A secured communication method of a V2X communication device according to an embodiment of the disclosure may include a secured communication method of a V2X communication device may include receiving a message based on V2X communication, extracting adaptive certificate pre-distribution (ACPD) target information if the message includes the ACPD target information, wherein the ACPD target information comprises at least one of a short-term certificate, time information indicating a generation time of the ACPD target information, effective time information of the short-term certificate, predicted location information where the short-term certificate is to be used, or predicted time information when the short-term certificate is to be used, pre-authenticating the short-term certificate, and transmitting the pre-authenticated short-term certificate so that the pre-authenticated short-term certificate is broadcasted at the predicted location.

The secured communication method according to an embodiment of the disclosure may further include collecting at least one pre-authenticated short-term certificate to be broadcasted at the predicted location on a specific time, and broadcasting an APCD broadcast message, comprising the collected at least one pre-authenticated short-term certificate, at the predicted location on the specific time.

Furthermore, in the secured communication method according to an embodiment of the disclosure, transmitting the pre-authenticated short-term certificate so that the pre-authenticated short-term certificate is broadcasted at the predicted location may further include transmitting the short-term certificate to a communication unit or V2X communication device having a communication range covering the predicted location.

Furthermore, in the secured communication method according to an embodiment of the disclosure, the short-term certificate may be a short-term certificate to be used at timing indicated by the predicted time information, which is different from timing of a short-term certificate used in current message communication.

Furthermore, in the secured communication method according to an embodiment of the disclosure, the ACPD broadcast message may include at least one of the at least one pre-authenticated short-term certificate, period information indicating a message broadcast period, or effective time information.

Furthermore, in the secured communication method according to an embodiment of the disclosure, the short-term certificate may correspond to a pseudonym certificate (PC) or an authorization ticket (AT).

A V2X communication device according to an embodiment of the disclosure includes a memory storing data, at least one communication unit transmitting and receiving at least one of a wired signal or a wireless signal, and a processor controlling the memory and the communication unit. The processor may be configured to receive a message based on V2X communication, extract adaptive certificate pre-distribution (ACPD) target information if the message includes the ACPD target information, wherein the ACPD target information may include at least one of a short-term certificate, time information indicating a generation time of the ACPD target information, effective time information of the short-term certificate, predicted location information where the short-term certificate is to be used, or predicted time information when the short-term certificate is to be used, pre-authenticate the short-term certificate, and deliver the pre-authenticated short-term certificate so that the pre-authenticated short-term certificate is broadcasted at the predicted location.

The V2X communication device according to an embodiment of the disclosure may be configured to collect at least one pre-authenticated short-term certificate to be broadcasted at the predicted location on a specific time, and broadcast an APCD broadcast message, comprising the collected at least one pre-authenticated short-term certificate, at the predicted location on the specific time.

Furthermore, in the V2X communication device according to an embodiment of the disclosure, the transmitted pre-authenticated short-term certificate may be broadcasted through a communication unit having a communication range covering the predicted location.

Furthermore, in the V2X communication device according to an embodiment of the disclosure, the short-term certificate may be a short-term certificate to be used at timing indicated by the predicted time information, which is different from timing of a short-term certificate used in current message communication.

Furthermore, in the V2X communication device according to an embodiment of the disclosure, the ACPD broadcast message may include at least one of the at least one pre-authenticated short-term certificate, period information indicating a message broadcast period, or effective time information.

Furthermore, in the V2X communication device according to an embodiment of the disclosure, the short-term certificate may correspond to a pseudonym certificate (PC) or an authorization ticket (AT).

Advantageous Effects

The disclosure proposes an adaptive certificate pre-distribution (ACPD) scheme for efficient message validation while maintaining a real-time property in a V2X communication system. The V2X communication system may be referred to as a connected automated vehicle (CAV) system. The disclosure can reduce a load of authentication when safety-related messages are transmitted and received in real time in an actual emergency situation or messages are exchanged in a congestion environment by proposing a scheme capable of adaptively and previously distributing a short-term-certificate (PC/AT) based on the aforementioned various V2X communication situations.

Hereinafter, effects of the disclosure are described along with embodiments.

DESCRIPTION OF DRAWINGS

FIG. 1 illustrates a cooperative intelligent transport system according to an embodiment of the disclosure.

FIG. 2 illustrates a trust message communication method of a vehicle-to-everything (V2X) communication system according to an embodiment of the disclosure.

FIG. 3 illustrates communication between V2X communication devices according to an embodiment of the disclosure.

FIG. 4 illustrates a protocol stack of a V2X communication device according to an embodiment of the disclosure.

FIG. 5 illustrates a protocol stack of a V2X communication device providing a security service according to a first embodiment of the disclosure.

FIG. 6 illustrates a method in which a V2X communication device performs security processing according to an embodiment of the disclosure.

FIG. 7 illustrates a peer-to-peer certificate distribution method according to an embodiment of the disclosure.

FIG. 8 illustrates an ACPD execution method of an ACPD sender according to an embodiment of the disclosure.

FIG. 9 illustrates an ACPD execution method of an ACPD transmitter according to an embodiment of the disclosure.

FIG. 10 illustrates an ACPD execution method of an ACPD broadcaster according to an embodiment of the disclosure.

FIG. 11 illustrates an ITS reference architecture for providing ACPD services according to an embodiment of the disclosure.

FIG. 12 illustrates a WAVE protocol stack to which an ACPD entity for providing ACPD services has been added according to an embodiment of the disclosure.

FIG. 13 illustrates an embodiment of the PC transmission and reception of vehicles according to an embodiment of the disclosure.

FIG. 14 illustrates another embodiment of the PC transmission and reception of vehicles according to an embodiment of the disclosure.

FIG. 15 illustrates a system block diagram for an ACPD implementation according to an embodiment of the disclosure.

FIG. 16 illustrates a method of transmitting ACPD information according to an embodiment of the disclosure.

FIG. 17 illustrates a method of transmitting ACPD information according to another embodiment of the disclosure.

FIG. 18 illustrates a V2X communication device according to an embodiment of the disclosure.

BEST MODE

Exemplary embodiments of the disclosure will be described in detail, and examples thereof are illustrated in the accompanying drawings. The detailed description, which will be given below with reference to the accompanying drawings, is intended to explain exemplary embodiments of the disclosure, rather than to show only embodiments that may be implemented according to the disclosure. The following detailed description includes specific details in order to provide a thorough understanding of the disclosure. However, it will be apparent to those skilled in the art that the disclosure may be practiced without such specific details. In the disclosure, respective embodiments described below need not be used separately. Multiple embodiments or all embodiments may be used together and a combination of specific embodiments may be also be used.

Although most terms used in the disclosure have been selected from general ones widely used in the art, some terms have been arbitrarily selected by the applicant and their meanings are explained in detail in the following description as needed. Therefore, the disclosure should be understood based upon the intended meanings of the terms rather than their simple names or meanings.

The disclosure relates to a vehicle-to-everything (V2X) communication device, in which the V2X communication device may be included in an intelligent transport system (ITS) to perform all or part of functions of the ITS. The V2X communication device may perform vehicle-to-vehicle communication, vehicle-to-infrastructure communication, vehicle-to-bicycle communication, vehicle-to-mobile communication, and the like. According to an embodiment, the V2X communication device may be an on board unit (OBU) of a vehicle, or may be included in an OBU. The OBU may also be referred to as an on board equipment (OBE). The V2X communication device may be a roadside unit (RSU) of an infrastructure, or may be included in an RSU. The RSU may also be referred to as roadside equipment (RSE). Alternatively, the V2X communication device may be an ITS station, or may be included in the ITS station. Any OBU, RSU, mobile equipment, or the like that performs V2X communication may be collectively referred to as an ITS station. Alternatively, the V2X communication device may be a wireless access in vehicular environments (WAVE) device, or may be included in the WAVE device. The V2X communication device may also be abbreviated to V2X device.

FIG. 1 illustrates a cooperative intelligent transport system (C-ITS) according to an embodiment of the disclosure.

The C-ITS is a system in which an information communication, control, and electronic technology is added to the existing transport system to improve efficiency in transport management and improve user convenience and safety. In the C-ITS, in addition to a vehicle, a transport infrastructure system such as a traffic light and an electronic display also performs V2X communication, and such an infrastructure may also be abbreviated to RSU as described above.

As illustrated in FIG. 1, in the C-ITS, a pedestrian device 1010, an RSU 1020, and vehicles 1030, 1040, and 1050, each of which includes the V2X communication device, perform communication with one another. According to an embodiment, the V2X communication may be performed based on a communication technology of IEEE 802.11p. The communication technology based on IEEE 802.11p may also be referred to as dedicated short-range communication (DSRC). According to an embodiment, the V2X communication based on IEEE 802.11p may be short-range communication within a range of about 600 m. Through the V2X communication, a cooperative awareness message (CAM) or a decentralized environmental notification message (DENM) may be broadcasted.

The CAM is distributed in an ITS network, and provides information regarding at least one of a presence, a location, or a communication state of the ITS station. The DENM provides information regarding a detected event. The DENM may provide information regarding any traveling situation or an event detected by the ITS station. For example, the DENM may provide information regarding a situation such as an emergency electronic brake light, an automobile accident, a vehicle problem, and traffic conditions.

In FIG. 1, the vehicles 1030 and 1040 are present within a communication coverage of the RSU 1020. However, the vehicle 1050 is present outside the communication range of the RSU 1020, and thus may not directly perform communication with the RSU.

FIG. 2 illustrates a trust message communication method of a V2X communication system according to an embodiment of the disclosure.

According to an embodiment illustrated in FIG. 2, the V2X communication system may be a security system required for V2X communication devices (e.g., an ITS station or a WAVE device) to safely send and receive a message for V2X communication. Such a V2X communication system may include one or more entities for trusted communication for a message. For example, the V2X communication system may include a root certificate authority (CA), an enrollment authority (EA), an authorization authority (AA), and/or at least one V2X communication device, as illustrated in FIG. 2. According to an embodiment, the V2X communication device may be an OBE, or an RSE.

The root CA may provide the EA and the AA with a proof to issue enrollment credentials. Such a root CA may define authorities and duties of the EA and the AA, certify the EA and the AA, and check performance of the duties by the EA and the AA. As such, the EA and AA may be controlled by the root CA.

The EA is an entity serving to manage a life cycle of the enrollment credentials, and may certify the V2X communication device and grant an access to V2X communication. The EA may also be referred to as a long-term certificate authority. Such an EA may issue an enrollment certificate (EC). The V2X communication device may have the EC for certification of whether the sending V2X communication device is a certified V2X sending device. The EC may also be referred to as a long term certificate (LTC).

The AA is an entity serving to issue an authorization ticket (AT) and monitor use of the AT, and may provide the V2X communication device with an authoritative proof to allow the V2X communication device to use a specific V2X service. The AA may also be referred to as a short-term certificate authority or a pseudonym certificate authority. Such an AA may issue the AT. The V2X communication device may have the AT for authentication of a V2X message (e.g., CAM or DENM) received by the V2X communication device. The AT may also be referred to as a short-term certificate or a pseudonym certificate (PC).

The V2X communication device may acquire the right to access V2X communication from the EA, and may negotiate with the AA for the right to call a V2X service. For example, the V2X communication device may request the EA for the EC (LCT), and acquire the EC from the EA. Further, the V2X communication device may request the AA for the AT (PC), and acquire the EC from the EA. In addition, the V2X communication device may send and receive a V2X message. For example, the V2X communication device may perform communication for a trust message with another V2X communication device by using the EC and the AT. Further, the V2X communication device may forward a receive V2X message to another V2X communication device. In the present disclosure, a V2X communication device sending a V2X message is referred to as a sending V2X communication device, a V2X communication device receiving a V2X message is referred to as a receiving V2X communication device, and a V2X communication device forwarding a received V2X communication device to another V2X communication device is referred to as a relaying V2X communication device.

A method in which V2X communication devices in the V2X communication system (security system) including the entities described above perform trust message communication will be described below in detail with reference to the respective drawings.

FIG. 3 illustrates communication between V2X communication devices according to an embodiment of the disclosure.

In a connected vehicle system, V2X communication devices mounted in a vehicle, an infrastructure, and a personalized device of a pedestrian may include device components illustrated in FIG. 3, respectively.

A description of components included in a V2X communication device of a vehicle according to an embodiment illustrated in FIG. 3 will be provided below. A V2X communication device of a vehicle may further include an OBE. According to an embodiment, the OBE may include a plurality of antenna systems and an OBE control process electronic control unit (ECU). Antenna system components may be integrated with each other or may be individually provided. Alternatively, a combination of some of the antenna system components may be included.

Global navigation satellite system (GNSS): A satellite navigation system that uses a radio wave transmitted from a satellite to calculate a location, a height, and a speed of a moving object across the earth, which may correspond to an antenna and a subsystem thereof included in a V2X communication device of a vehicle and configured to obtain location information of the vehicle Dedicated short range communication (DSRC) radio subsystem: An antenna and a subsystem thereof for sending/reception according to a DSRC protocol Cellular subsystem: An antenna and a subsystem thereof for cellular data communication Broadcasting subsystem: An antenna and a subsystem thereof for sending/reception of broadcasting data OBE control process ECU: The OBE control process ECU may be abbreviated to a controller or a processor. The controller may process a data message received from a plurality of heterogeneous systems and control other ECUs in the vehicle to perform appropriate operation. The controller may execute an application for the data processing and vehicle control/operation. Further, the controller may process sensing data received from other electronic equipment or sensors in the vehicle and send the processed sensing data to external V2X communication devices/vehicles. According to an embodiment, all information in the vehicle may be converted into a standardized format that is sharable through the controller. As illustrated in FIG. 3, a safety application may be executed to send and receive information to and from a bus such as a controller area network (CAN) or Ethernet in the vehicle. Further, information may be provided to a user through a driver vehicle interface (DVI) such as a stereo and a display in the vehicle.

The V2X communication device configured as described above may perform communication with an infrastructure, a pedestrian, and a supported system such as a cloud/server, in addition to another vehicle.

A description of components included in a V2X communication device of an infrastructure according to an embodiment illustrated in FIG. 3 will be provided below. A V2X communication device of an infrastructure may include an RSE. Similarly to the OBE of the vehicle, the RSE may include a plurality of antenna systems and a controller (processor). Antenna system components may be integrated with each other or may be individually provided. Alternatively, a combination of some of the antenna system components may be included. Meanwhile, the controller of the RSE may perform operations that are the same as or similar to those of the controller of the OBE. For example, the controller of the RSE may process a data message received from a plurality of heterogeneous systems and control other ECUs in the infrastructure to perform appropriate operation.

The RSE may receive information from a traffic controller to perform communication with a vehicle. The RSE may be a fixed device, and may be backend-connected to be operated as a provider. However, according to an embodiment, the RSE may collect information from a vehicle and send the information again, and thus the RSE may be operated not only as a provider device, but also as a user device.

A description of components included in a V2X communication device of a personalized device (VRU device) of a pedestrian according to an embodiment illustrated in FIG. 3 will be provided below. The V2X communication device of the VRU device may include a plurality of antenna systems and a controller (processor). Antenna system components may be integrated with each other or may be individually provided. Alternatively, a combination of some of the antenna system components may be included. Meanwhile, the controller of the VRU device may perform operations that are the same as or similar to those of the controller of the OBE. For example, the controller of the VRU device may process a data message received from a plurality of heterogeneous systems and control other ECUs in the personalized device to perform appropriate operation. The controller may execute an application for the data processing and control/operation of the personalized device. Further, the controller may process sensing data received from other electronic equipment or sensors in the personalized device and send the processed sensing data to external V2X communication devices. As illustrated in FIG. 3, a safety application may be executed to send and receive information to and from components in the personalized device. Further, information may be provided to a user through a VRU interface such as a stereo and a display in the personalized device.

As illustrated in FIG. 3, communication between vehicles may be referred to as V2V communication, communication between a vehicle and an infrastructure may be referred to as V2I communication or I2V communication, and communication between a vehicle and a personalized device of a pedestrian may be referred to as V2P communication or P2V communication. As illustrated in FIG. 3, communication between vehicles using DSRC may be referred to as DSRC V2V communication, communication between a vehicle and an infrastructure using DSRC may be referred to as DSRC V2I communication or DSRC I2V communication, and communication between a vehicle and a personalized device of a pedestrian using DSRC may be referred to as DSRC V2P communication or DSRC P2V communication. Meanwhile, communication between a vehicle and another V2X communication device may be collectively referred to as V2X communication, and communication between a V2X communication device and another V2X communication device may be collectively referred to as X2X communication.

FIG. 4 illustrates a protocol stack of a V2X communication device according to an embodiment of the disclosure. Specifically, FIG. 4 illustrates a protocol stack of a V2X communication device of United States (US) or Europe (EU) according to an embodiment of the disclosure.

The V2X communication devices illustrated in FIG. 3 may perform communication with one another by using a communication protocol for V2X communication illustrated in FIG. 4.

Description of respective layers illustrated in FIG. 4 is provided below.

Applications layer: The applications layer may implement and support various use cases. For example, an application may provide information regarding road safety, efficient traffic information, information regarding other applications.

Facilities layer: The facilities layer is a layer corresponding to open systems interconnection (OSI) layer 5 (session layer), OSI layer 6 (presentation layer), and OSI layer 7 (application layer). The facilities layer may support effective implementation of various use cases defined in the applications layer. For example, the facilities layer may provide an application programming interface (API) for encoding/decoding a message for supporting an application. According to an embodiment, the message may be encoded/decoded in abstract syntax notation one (ASN.1).

A service and a message set provided in the facilities layer is defined by the Society of Automotive Engineers (SAE) in U.S., and is defined by Intelligent Transport Systems (ITS) of European Telecommunications Standards Institute in Europe. For example, a basic safety message (BSM) for supporting a basic safety application, an emergency vehicle alert (EVA) message, a MAP (mapdata) message for supporting an intersection safety application, a signal phase and timing (SPAT) message, an intersection collision alert (ICA) message, a roadside alert (RSA) message for supporting a traveler information application, a traveler information message (TIM), and the like may be provided as the message set in U.S. A cooperative awareness message (CAM), a decentralized environmental notification message (DENM), and the like may be provided as the message set in Europe.

Networking/transport layer: The networking/transport layer is a layer corresponding to OSI layer 3 (network layer) and OSI layer 4 (transport layer). The networking/transport layer may configure a network for vehicle communication between homogenous/heterogeneous networks by using various transport protocols and network protocols. For example, the networking/transport layer may provide Internet access and routing using the Internet protocol such as TCP/UDP+IPv6. Alternatively, the networking/transport layer may configure a vehicle network by using a geographical-position-based protocol such as basic transport protocol (BTP)/GeoNetworking. Alternatively, the networking/transport layer may configure a vehicle network by using a WAVE short message protocol (WSMP) (e.g., WSMP-N and WSMP-T).

Further, the networking/transport layer may provide an advertisement of provided services. For example, such an advertisement may be provided through WAVE service advertisement (WSA) in U.S., and may be provided through a service announcement message (SAM) in Europe.

Access layer: The access layer is a layer corresponding to OSI layer 1 (physical layer) and OSI layer 2 (data link layer). The access layer may send, on a physical channel, a message/data received from a higher layer. For example, the access layer may perform/support data communication based on at least one of a communication technology based on IEEE 802.11 and/or 802.11p standard, a WIFI physical transmission technology based on IEEE 802.11 and/or 802.11p standard, a DSRC technology, a 2G/3G/4G (LTE)/5G wireless cellular communication technology including satellite/broadband wireless mobile communication, a global positioning system (GPS) technology, Bluetooth, or a WAVE technology based on IEEE 1609. Meanwhile, in U.S., a medium access control (MAC) technology based on IEEE 1609.4 standard is complemented and used to support communication in a vehicle environment.

Security layer: The security layer is a layer for data trust and privacy. The security layer may provide an authentication function and an encryption function for assuring privacy. The authentication is used to indicate whether or not a sender is a certified V2X communication device and whether or not data are changed, and the encryption is used to keep secrets in data. According to an embodiment, the message or data generated in the networking/transport layer may be sent after being secured through the security layer according to a type of the message or data, or may be sent in a non-secured state.

Management layer: The management layer may provide multi-channel decentralized congestion control (MDCC). Further, the management layer may generate contents for a service advertisement based on information received from a higher layer, and the contents may include IP configuration information and security credential information. Further, the management layer may monitor the received service advertisement and estimate a channel quality to determine a channel allocation/switching schedule.

FIG. 5 illustrates a protocol stack of a V2X communication device providing a security service according to a first embodiment of the disclosure.

According to an embodiment illustrated in FIG. 5, the V2X communication device may be a V2X communication device (e.g., WAVE device) providing a security service based on IEEE 1609.2 standard. The security service in FIG. 5 may be referred to as a WAVE security service, and the protocol stack in FIG. 5 may be referred to as a WAVE protocol stack. The security service illustrated in FIG. 5 may include an internal security service and a higher external security service.

First, the internal security service may provide a secure data service (SDS) and a security services management entity (SSME).

The SDS may manage a protocol data unit (PDU). For example, the SDS may convert an unsecured PDU into a secured PDU (SPDU). Further, the SDS may perform processing of the SPDU at the time of reception, and in this processing, the SPDU is converted into a PDU. In this case, a format of the SPDU may be signed data or encrypted data. An entity using the secure data service may be referred to as a secure data exchange entity (SDEE).

The SSME may manage information regarding certificates. For example, the SSME may store/manage certificates stored in the SDS and certificate information regarding certificates belonging to certificate authorities (CA).

The higher layer security service may provide a certificate revocation list verification entity (CRLVE) and a peer-to-peer certificate distribution entity (P2PCDE).

The CRLVE may verify an incoming certificate revocation list (CRL). For example, the CRLVE may verify a CRL received from the SSME or to be forwarded to the SSME. Further, the CRLVE may forward relevant revocation information to the SSME for storage.

The P2PCDE enables peer-to-peer certificate distribution. The P2PCDE allows the WAVE device to learn unknown certificates. In this case, the WAVE device may request another peer device for necessary information and learn the unknown certificates by using the information.

In order to provide the above-described service, IEEE 1609.2 standard illustrated in FIG. 5 provides a service access point (SAP) (e.g., Sec-SAP, SSME SAP, and SSME-Sec SAP), and communication from one entity to another entity based on IEEE 1609.2 standard may be performed through the SAP. Such a communication may be referred to as data exchange between SDEEs.

FIG. 6 illustrates a method in which a V2X communication device performs security processing according to an embodiment of the disclosure.

As in FIG. 5, in an embodiment of FIG. 6, the V2X communication device may be a V2X communication device (e.g., WAVE device) providing a security service based on IEEE 1609.2 standard. The embodiment illustrated in FIG. 6 shows an illustrative flow of security processing using the SDS(Security Data Service).

Referring to FIG. 6, the SDS may be called by the SDEE together with a request for processing data. The processed data may be returned to the SDEE that performs the call. The secure data exchange may include two SDEEs, one of which may be a sending SDEE, and the other of which may be a receiving SDEE.

The sending SDEE may call the SDS to perform security processing for sending. In this case, a result of the processing may be an SPDU returned to a sending entity. The sending SDEE may call the SDS at least once, if possible, may call the SDS multiple times before sending the SPDU.

The receiving SDEE may call the SDS to perform security processing for contents of the received SPDU. In this case, a result of the processing that may include the SPDU and additional information regarding the SPDU may be returned to the receiving SDEE. Complete processing of the received SPDU may require multiple calls.

FIG. 7 illustrates a peer-to-peer certificate distribution method according to an embodiment of the disclosure.

A responder 7010 is the sender of a trigger SPDU. When a signed SPDU including a learning request is received, the responder 7010 starts a P2PCD learning response process. The responder 7010 starts the P2PCD learning response process when a trigger SDEE receives a request indicating that an SDS has processed the signed SPDU including a P2PCD response request through "Sec-SecureDataProcessing.request." When the P2PCD learning response process is triggered, after an SSME randomly waits for a period equal to or smaller than p2pcd_maxResponseBackoff, it generates a response and transmits the response to a P2PCDE. The P2PCD learning response includes requested certificates. The P2PCDE receives a P2PCD learning response and provides it to the SSME. The SSME stores the certificates and increases a recorded number.

A requester 7020 is the receiver of a trigger SPDU. The role of the requester 7020 is started when a trigger SDEE makes a process request for an SPDU in which an SDS has been signed along with the signed identifier (SignedIdentifier) of a certificate type through Sec-SecureDataPreprocessing.request. With respect to the triggering request for an issuer, an SSME generates the SDS. The SDS is included in the signed SPDU including a P2PCD learning request for the issuer. The requester 7020 may transmit, to the responder 7010, the signed SPDU including the learning request. When a P2PCDE generates a P2PCD learning response, the requester 7020 enables the SSME to store a corresponding certificate using SSMEAddCerficate.request and makes the corresponding certificate become a known certificate.

Table 1 shows various parameters for PC management called a pseudonym change (PC) or an authorization ticket (AT) in the standard and project of the United States and Europe.

supporting a V2X application over V2X safety based on V2X communication that satisfies such requirements. In contrast, unlike in a conventional technology, there is a new challenge and vulnerable problem for the communication and security of a vehicle. For example, a specific vehicle may falsely transmit electronic emergency brake light (EEBL) messages to other surrounding vehicles in order to rapidly run. Furthermore, the contents of a normally transmitted message may be halfway changed by the attack of an attacker. Accordingly, a message authentication scheme is necessary for messages that are transmitted and received in V2X communication. Specific messages may be signed and transmitted so that a receiver can authenticate that the specific messages have been transmitted by an authenticated and trusted ITS-Station and have not been halfway changed.

A problem is that a cryptographically signed message has an identifier, such as a certificate, and thus a privacy issue may occur because personal data of a specific identifier, such as the position or time of common messages such as CAN or DENM, can be traced and predicted through the collection of the personal data if the personal data is connected and the messages are traced for a long time. That is, a path, time, etc. may be traced from the running start of a specific vehicle to the end. The personal data means all pieces of information related to information capable of identifying a specific person/specific vehicle. Several schemes capable of guaran-

TABLE 1

| Parameter | SCOOP@F | C2C-CC | SAE | ETSI | IFAL | CAMP |
|---|---|---|---|---|---|---|
| PC Lifetime | 1 week | 1 week | | not-defined | 12 minutes | 1 week |
| Number of Parallel PCs | 10 | 10 | | not-defined | 2 | 20 |
| PC Lifetime Overlap | Yes | Yes | | not-defined | Yes | |
| Max Reuse Number | after 40000 signatures | | | not-defined | 12 minutes | |
| PC Pool Size | 260 | 1040 | | not-defined | 2 | |
| PC Certificate Tank | 6 months | 36 months | | not-defined | 10 years | 1 year |
| Rule | ignition After 40000 signatures | Ignition Randomly after 10~30 minutes | Ignition every 5 minutes | not-defined | Location every 10 minutes based on dynamic selection | Rotation every 10 minutes based on dynamic selection-mix-zone approach |

The existing ITS-related V2X network system has been configured to satisfy the following basic requirements for fast and reliable communication.

Operating in a rapidly varying environment

Fast and reliable communications, allowable latency (less than 100 ms)

Maintaining connections with speeding vehicles at all times

Strictly QoS committed in conjunction with pre-defined maximum delay for safety messages Minimum of transmission power to avoid interference Guaranteeing maximum privacy and anonymity of roaming users Supporting one-way, two-way, point-to-point, point-to-multipoint and multi-hop (e.g., vehicle-to-vehicle) communication Transmission mode: event-driven, periodic Requiring maximum range of communication (more than 100 ms, max 300 ms)

A loss of lives and economical damage attributable to a traffic accident which may occur due to the physical characteristics of a vehicle and a road can be reduced by teeing privacy are not proposed. The greatest characteristic is that a pseudonym certificate (PC) or an authorization ticket (AT), that is, a PKI-based short-term certificate, is used in an ITS system during a short period. However, two improvements are additionally necessary because the PC is used. One is an efficiency problem with the issue of an AT and corresponding AT management within the ITS station. The other is an efficiency problem with message validation upon communication between ITS stations.

In relation to the issue and management of the AT, Table 1 illustrates that how a PC is generated, maintained and managed within an ITS station. FIG. 2 illustrates how a message signed using SCMS or PKI system is authenticated in V2V communication. The aforementioned embodiments show technical solutions regarding that an ITS station has previously issued and had a specific number of ATs and how frequently will a corresponding AT list be used, replaced and reused according to which policy.

In order to authenticate the messages of other ITS stations received by a vehicle that supports V2X communication, a receiver needs to prove the authenticity of message transmitted by transmitters. For example, if all vehicles continue to change their own PCs every 5 minutes based on a criterion described in the NPRM of the United States, a receiver that has received a message that has been signed by a corresponding PC has to authenticate the PC again because the PC has been changed in the situation in which a message transmitted by the same transmitter cannot be unknown. That is, all ITS stations continue to connect to a server through surrounding infrastructure and have to be authenticated or unconditionally trust a PC. Accordingly, if the ITS stations attempt connections to the server of an SCMS/PKI every time, low latency of V2X communication and the effectiveness of a short message may be reduced. If all the ITS stations unconditionally trust a PC, security is reduced. If communication with a certification server is difficult for a reason because an RSE is not present nearby, V2X communication may also become difficult because authentication itself is impossible. As a result, in order to obtain reliability, consistency and privacy, dependency on the latency, complexity and infrastructure of the existing V2X communication is increased. Although authentication is possible, the number of certification messages and the size of a message may suddenly increase in a congestion environment in which many vehicles are in/out within a surrounding DSRC range while the vehicles run or depending on various conditions, such as an increase in the number of messages according to an emergency situation in which vehicles are increased nearby. Accordingly, V2X communication may be delayed or impossible in the situation in which safety-related message/information must be transmitted/received. In order to solve such a problem, a certificate distribution service, such as P2PCD, or a method, such as Certificate Digest, for authenticating a PC issued by an unknown CA without server access has been proposed and applied to the United State or Europe standard, but an additional solution may still be necessary.

The disclosure proposes an adaptive certificate pre-distribution (ACPD) scheme for efficient message validation while maintaining a real-time property in a V2X communication system. The V2X communication system may be referred to as a connected automated vehicle (CAV) system. The disclosure can reduce a load of authentication when safety-related messages are actually transmitted and received in an emergency situation in real time or when messages are exchanged in a congestion environment by proposing a scheme capable of previously and adaptively distributing a short-term-certificate (PC/AT) based on the aforementioned various V2X communication situation.

In the disclosure, an adaptive certificate pre-distribution (ACPD) method may be performed under the following assumptions.

A moving ITS station, such as all ITS-vehicles or a pedestrian station, has its own past path history and predicted path, and its own current location information through a GPS (not necessary for an RSE).

A specific ITS station may have path information up to its own final destination and a corresponding destination through a system, such as navigation, when predicting a predicted path.

In order to improve efficiency of PC authentication for reliable information reception through V2X communication, an ITS station has a PC pool that will be used ahead of a PC in the future previously in addition to a currently used PC (a PC pool size may be different in each system.).

An ITS station is aware of whether to change its own PC using a PC pool based on which method.

Through the basic assumptions, each ITS stations may predict where it will be located in a given time and which PC will be used at that time. The disclosure proposes the following adaptive certificate pre-distribution (ACPD) method using the basic assumptions.

An ITS station checks whether the ITS station and a surrounding situation are a situation suitable for performing an ACPD.

The ACPD of a PC may not be performed in an emergency situation or a situation having a heavy load, such as a congestion situation.

An ITS station generates an ACPD information/message based on target information which may be obtained through various pieces of information (predicted path information and navigation information). The target information may include information, such as location information after a specific time, a PC to be used in a corresponding time, a current time, and time when a PC will be actually used.

An ITS station may transmit generated ACPD information to an ACPD transmitter, and may request the final ACPD broadcaster that will actually process information to transmit the ACPD information.

The role of an ACPD transmitter may be omitted depending on a communication method, a surrounding environment or a policy, and an ITS station that is an ACPD sender may directly transmit ACPD information to an ACPD broadcaster.

The actual authentication of a previously transmitted PC may be performed by an ACPD transmitter or an ACPD broadcaster.

Hereinafter, ACPD operations of an ACPD sender, ACPD transmitter and ACPD broadcaster are described.

FIG. 8 illustrates an ACPD execution method of an ACPD sender according to an embodiment of the disclosure.

An ACPD sender indicates an ITS station that generates ACPD information for an ACPD.

The ACPD sender may check whether a situation within a current communication range is a situation in which an ACPD operation can be initiated (S8010). The ACPD sender may check whether the situation is a situation in which an ACPD information/message can be transmitted based on whether the situation is an urgent situation or a congestion situation.

The ACPD sender may predict a predicted path to pass in a given time (S8020). In an embodiment, the ACPD sender may predict a predicted path after a PC change.

The ACPD sender may generate target information (S8030). The target information may include at least one of target time information, target location information, or a target certificate.

The ACPD sender may transmit the target information to an ACPD transmitter (S8040). The target information corresponds to an ACPD information/message or may be included in an ACPD information/message.

FIG. 9 illustrates an ACPD execution method of an ACPD transmitter according to an embodiment of the disclosure.

The ACPD transmitter is an ITS station within the communication range of an ACPD sender, and may correspond to an RSU. The ACPD transmitter may transmit ACPD information to an ACPD broadcaster at a target location to which a PC needs to be transmitted for an ACPD.

The ACPD transmitter may check whether the received message is an ACPD message or target information (S9010).

The ACPD transmitter may perform PC authentication based on the target information included in ACPD information (S9020).

If the PC authentication is successful (S9030), the ACPD transmitter may transmit ACPD information to an ACPD broadcaster located at a predicted location (S9040). The ACPD information transmitted to the ACPD broadcaster may include an authenticated PC.

FIG. 10 illustrates an ACPD execution method of an ACPD broadcaster according to an embodiment of the disclosure.

The ACPD broadcaster is an ITS station which is closest to an area to which a PC will be transmitted or which can best transmit a message to a corresponding area, and may correspond to an RSU. That is, the ACPD broadcaster may be at least one RSU that covers the predicted location of a V2X transmission apparatus, that is, an ACPD transmitter, as a communication range.

The ACPD broadcaster may check whether a received message is an ACPD message (S10010).

The ACPD broadcaster may collect an authenticated predicted PC by receiving an ACPD (S10020).

The ACPD broadcaster may collect certificates having a similar PC broadcasting time and wait until proper timing (S10030).

The ACPD broadcaster may broadcast, to surrounding ITS stations, a message including information for an ACPD (S10040).

The operation of FIG. 9 and the operation of FIG. 10 may be continuously performed in a V2X apparatus. That is, a plurality of RSUs may be connected. Such operations of the RSUs may be controlled by a single control system. That is, an ACPD transmitter and an ACPD broadcaster may correspond to a single V2X communication device. In this case, the single control system is a V2X apparatus, and may control a plurality of RSUs. FIGS. 9 and 10 have been described in separate sequences from the viewpoint of an RSU. However, a system that controls an RSU may be referred to as one V2X communication device including a plurality of RSUs. In such a case, a V2X communication device corresponding to an RSU control system may continuously perform the operations of FIGS. 9 and 10.

FIG. 11 illustrates an ITS reference architecture for providing ACPD services according to an embodiment of the disclosure.

The facilities of an ACPD sender may configure a message, including target information through message processing, such as CAM/DANM or a basic information message (BIM), and may transmit the message to networking and a transport layer.

An ACPD transmitter that has received the message may transmit target information to an ACPD broadcaster. The ACPD broadcaster that has received the target information may broadcast, to its own area, PCs that have been previously authenticated based on timing in which the PCs are valid at proper timing.

FIG. 12 illustrates a WAVE protocol stack to which an ACPD entity for providing ACPD services has been added according to an embodiment of the disclosure.

In FIG. 12, an adaptive certificate pre-distribution entity (APCD entity) has been added to the aforementioned WAVE protocol stack. The ACPD entity, as described above, may perform ACPD operations, such as the transmission of ACPD information, the pre-authentication of a PC and the broadcast of ACPD information/PC.

FIG. 13 illustrates an embodiment of the PC transmission and reception of vehicles according to an embodiment of the disclosure.

In FIG. 13, a colored vehicle on the upper side a white vehicle on the lower side may be referred to as a blue car (BC) 13010 and a white car (WC) 13020, respectively. In FIG. 13, a blue car pseudonym certificate (bp) indicates the PC of the BC, and a white car pseudonym certificate (wp) indicates the PC of the WC. In FIG. 13, the PC of the BC 13010 is changed into bp1~bp9 over time. Furthermore, the PC of the WC 13020 is changed into wp1~wp6 over time. A PC change time is indicated as b in the case of the bp and a in the case of the wp on the basis of a current time t0. a and b are not fixed values, but may be variable values based on a PC change policy.

As in FIG. 13, if the BC 13010 and the WC 13020 that rune in parallel continue to exchange their own information as V2V messages, a PC continues to be changed. Accordingly, if a PC received through a message is changed, each vehicle has to authenticate the changed PC again.

FIG. 14 illustrates another embodiment of the PC transmission and reception of vehicles according to an embodiment of the disclosure.

FIG. 14 illustrates a first vehicle 14010, a second vehicle 14020, and a third vehicle 14030 running in different directions. Each of the vehicles runs with a different PC period at a different speed in a different direction. In this case, all the three vehicles are expected to pass through coverage of an RSU 3 after a given time. According to the existing PC authentication method, the three vehicles perform PC authentication while exchanging messages at different timing.

If the ACPD method of the disclosure is used, however, the first vehicle 14010 may transmit a PC to be used at T timing in which it will pass through coverage of the RSU 3 to an RSU 0. The second vehicle 14020 may transmit a PC to be used at T timing in which it will pass through coverage of the RSU 3 to an RSU 1. The third vehicle 14030 may transmit a PC to be used at T timing in which it will pass through coverage of the RSU 3 to an RSU 2. Accordingly, when the T timing is reached, the RSU 3 may broadcast the PCs of the three vehicles that have been already authenticated.

Message authentication is performed, but is not performed by each of vehicles/ITS stations and an ACPD transmitter or ACPD broadcaster, such as an RSU that has previously received a PC transmits an authenticated certificate. Accordingly, an authentication time is reduced, and message validation and processing can be performed without latency at T timing because authentication is previously performed. Furthermore, in V2V communication having an authenticated certificate, a Certificate Digest having a very small size has only to be used instead of a Full Certificate. Accordingly, if the Full Certificate is assumed to be approximately 140 bytes and a corresponding Certificate Digest is calculated as 10 bytes, a size of about 130 bytes can be reduced whenever a message is transmitted. In particular, as in the embodiment of FIG. 14, if a plurality of vehicle has to meet and perform authentication at an intersection, the recovery and latency of authentication can be reduced. Furthermore, as the number of transmitted and received messages is increased due to the occurrence of an emergency situation in a congestion situation, an effect is increased because message validation is omitted and a safety message can be directly transmitted and received in a smaller size. If a vehicle does not run along a predicted path, however, an unnecessary PC may be broadcasted. Even in this case, side effects are not great because a PC is not broadcasted and is deleted from the trusted PC list of each vehicle when the vehicle passes through a feature time (PC exchange time).

An effect of an ACPD operation is increased and a burden of mismatching is reduced as a predicted path and a predicted time become accurate.

Table 2 illustrates target information transmitted from an ACPD sender to an ACPD transmitter or an ACPD broadcaster.

TABLE 2

| Descriptive name | ACPD target information |
|---|---|
| Identifier | PC |
| Time information/timestamp | May indicate generation timestamp, ACPD target information or generation time of PC. |
| Effective time | Time information which the PC will be active |
| Predicted location | Predicted location where the PC will be used |

Table 3 and Table 4 illustrate embodiments of ACPD broadcast information included in an ACPD message, in which an ACPD broadcaster collects target information received from an ACPD sender or ACPD transmitter, collects PCs having the same effective time, and broadcasts a trusted PC for specific duration at a specific time.

TABLE 3

| Descriptive name | ACPD broadcasting information |
|---|---|
| Effective time | Effective time |
| Duration | Duration in which message is broadcasted |
| Number of target information | Number of target information |
| PCs | PC list |

TABLE 4

| Descriptive name | ACPD group information |
|---|---|
| Number of ACPDs | Number of ACPDs |
| Full Pseudonym Certificate (PC) | Full Pseudonym Certificate (FPC) |
| HASH value of FPC | Pseudonym Certificate Digest (PCD) |
| Effective time | Effective time |
| Duration | Duration in which message is broadcasted |

FIG. 15 illustrates a system block diagram for an ACPD implementation according to an embodiment of the disclosure.

In FIG. 15, a first vehicle 15010 and a second vehicle 15020 perform a message exchange using an ACPD. Each vehicle 15010 includes a driver warning generator, a processor, a main memory, an in-vehicle bus, a communication unit (DSRC/cellular unit), and a GPS unit.

The first vehicle transmits ACPD information to an RSE 15030. The RSE may authenticate a PC received from the first vehicle. Furthermore, the RSE may broadcast the authenticated PC at the predicted location/time of the first vehicle. That is, the RSE may broadcast a previously authenticated PC on a predicted time at the predicted locations of the first vehicle and the second vehicle. Accordingly, the first vehicle and the second vehicle may directly perform V2V communication.

RSEs are connected and can communicate with each other. The RSE may manage a traffic signal through communication with a traffic management entity or a traffic office processing center. From the viewpoint of such connectivity, a plurality of RSEs connected as described above may be considered to be a single V2X apparatus. In an ACPD operation, RSEs may receive a message transmitted by the first vehicle 15010 and transmit the message to another RSE in an area where the first vehicle 15010 will reach in the future. The RSE may previously access a PKI and authenticate a PC. The RSE may share all PC lists by transmitting ACPD information to the second vehicle 15020 at proper timing. Accordingly, the first vehicle 15010 and the second vehicle 15020 can immediately perform communication using only a Digest without additional PC authentication.

FIG. 16 illustrates a method of transmitting ACPD information according to an embodiment of the disclosure.

FIG. 16 illustrates a (signed type) SPDU including ACPD target information for transmitting, by an ACPD sender, ACPD information to be used in the future to a surrounding ACPD transmitter or ACPD broadcaster. In an embodiment, FIG. 16 illustrates an SPDU including ACPD target information based on the IEEE 1609.2 standard. AACPD transmitter may transmit a signed SPDU, and the signed SPDU may include a PC to be used in the future.

An ACPD sender may configure an SPDU, including payload 1602 and a header. The payload may become ACPD target information. A field (appSend) 1601 indicative of ACPD transmission may be optionally added to the header information. A description of fields included in the header is as follows.

PSID: Service provider ID, and a new PSID value for ACPD/ACPDG may be allocated to the PSID.

generationTime: message generation time expiryTime: message expiry time generationLocation: message generation area information. In an embodiment, a receiver may use this to exclude a message in a too far area.

P2PCDrequest: ID used upon peer-to-peer learning request. An ID value for corresponding to multiple requests MissingCrlIdentifier: used upon transmission in order to identify a missing CLR.

EncryptionKey: ciphering/encryption key acpdSend: applied to correspond to multiple requests when an ACPD sender transmits ATI information.

If the payload and the header information are configured, data (ToBiSignedData) 1603 to be signed as in (1) of FIG. 16 is configured. In an embodiment, the data to be signed may be included as part of the signed data (SignedData) of IEEE 1609.2 as in (2). Furthermore, the data may be used as input data for producing a signature.

In (3), a signature/sign may be generated through a hash and a signature/sign. A message, such as BSM, is generated using a PC that is now used. In the disclosure, however, a hash and a sign are performed using a PC to be used in the future, which is transmitted as ACPD. The reason why such an operation is performed is that if the future PC and current PC of payload are transmitted at once, other ITS stations may trace a corresponding ITS station because a relation between certificates is exposed, and thus a privacy issue may occur.

A hash and a sign may be performed like signing and verification using a common asymmetric cryptography. That is, an ACPD sender inputs data to be transmitted as the input of a predetermined hash function, and obtains a hash value that is an output result. Furthermore, the ACPD sender generates a signature using an electronic signature algorithm using the hash value and its own private key.

As a result, if an SPDU is configured as described above, a receiver that has received the final SPDU generated by the ACPD sender obtains the hash value by calculating parsed ToBeSignedData as the input of the same hash function. Furthermore, the receiver may perform validation, such as the intermediate forgery of a message using the obtained hash value, the received signature, and the public key of the ACPD sender.

In (4) of FIG. 16, the transmission side adds HashIdentifier to ToBeSignedData in order to notify which hash algorithm has been used when a corresponding message is received. Information (Signerinfo) and signature of a signatory/signer are added behind ToBeSignedData, that is, the payload. After the final signedData is generated as described above, transmission data is generated by adding version information and type information as the header.

A description of fields included in Signed Data is as follows.

HashAlgorithm: the hash algorithm field indicates a Hash algorithm used to sign and authenticate a message.

ToBeSignedData is data to be actually transmitted and is personal data of a HASH function for signing.

SignerIdentifier: the signer identifier indicates that which key material has been used for message validation. The signer identifier may indicate one of Digest, Certificate or Self. The Digest is a case where Certi.Digest is used and is used when a counterpart already has a Full Certificate. The Certificate is selected when a Full Certificate is used. The Self is selected when it is itself.

Signature: electronic signature/the signature

FIG. 17 illustrates a method of transmitting ACPD information according to another embodiment of the disclosure.

FIG. 17 is the same as FIG. 16, but corresponds to a case where an RSU broadcasts to another ITS station. Accordingly, there is no privacy issue, and a future certificate does not need to be used like FIG. 17. Furthermore, the aforementioned ACPD broadcasting information (ABI) information may be included in payload and transmitted.

FIG. 18 illustrates a V2X communication device according to an embodiment of the disclosure.

In FIG. 18, the V2X communication device 18000 may include a communication unit 18010, a processor 18020 and a memory 18030. As described above, the V2X communication device may correspond to an on board unit (OBU) or a road side unit (RSU) or may be included in an OBU or an RSU. The V2X communication device may be included in an ITS station or may correspond to an ITS station.

The communication unit 18010 is connected to the processor 18020 and may transmit/receive a wireless/wired signal. The communication unit 18010 may up-convert data, received from the processor 18020, in a transmission and reception band, and may transmit a signal. The communication unit 18010 may implement an operation of an access layer. In an embodiment, the communication unit 18010 may implement an operation of a physical layer included in an access layer or may additionally implement an operation of a MAC layer. The communication unit 18010 may include a plurality of sub-RF units in order to perform communication according to a plurality of communication protocols.

The processor 18020 is connected to the communication unit 18010, and may implement operations of layers according to an ITS system or a WAVE system. The processor 18020 may be configured to perform operations according to various embodiments of the disclosure in the aforementioned drawings and description. Furthermore, at least one of a module, data, program or software that implements an operation of the V2X communication device 18000 according to the aforementioned various embodiments of the disclosure may be stored in the memory 18030 and may be executed by the processor 18020.

The memory 18030 is connected to the processor 18020, and stores various pieces of information for driving the processor 18020. The memory 18030 may be included in the processor 18020 or positioned outside the processor 18020 and may be connected to the processor 18020 by well-known means. The memory 18030 may include a security/non-security storage device or may be included in a security/non-security storage device. In some embodiments, the memory may be referred to as a security/non-security storage device.

A detailed configuration of the V2X communication device 18000 of FIG. 18 may be implemented so that the aforementioned various embodiments of the disclosure are independently applied or two or more of the embodiments are applied.

The V2X communication device 18000 may perform a secured communication method as described above. The V2X communication device/processor may perform the following secured communication method.

The V2X communication device may receive a message based on V2X communication, and may extract adaptive certificate pre-distribution (ACPD) target information if the message includes the ACPD target information. The ACPD target information may include at least one of a short-term certificate, time information indicating the generation time of the ACPD target information, effective time information of the short-term certificate, predicted location information where the short-term certificate is to be used, or predicted time information when the short-term certificate is to be used. The V2X communication device may pre-authenticate the short-term certificate, and may transmit the pre-authenticated short-term certificate so that the pre-authenticated short-term certificate is broadcasted at a predicted location. A target to which the short-term certificate is transmitted may be another V2X communication device or may be one of a plurality of communication units connected to the V2X communication device.

The V2X communication device may collect at least one pre-authenticated short-term certificate to be broadcasted at a predicted location on a specific time, and may broadcast an APCD broadcast message, including the collected at least one pre-authenticated short-term certificate, at the predicted location on the specific time. As described above, the previous collection of the certificate and the broadcast of the ACPD broadcast message may be performed by another V2X communication device.

An operation of transmitting the short-term certificate of a V2X communication device at a predicted location may further include the step of transmitting the short-term certificate to a communication unit or V2X communication device having a communication range in which the predicted location is covered.

The short-term certificate may be a short-term certificate to be used at timing indicated by predicted time information, which is different from that of a short-term certificate used in current message communication. Furthermore, the ACPD broadcast message may include at least one of at least one pre-authenticated short-term certificate, period information indicating message broadcast duration, or effective time information. The short-term certificate may correspond to a pseudonym certificate (PC) or an authorization ticket (AT).

The above-described embodiments have been achieved by combining the elements and characteristics of the disclosure in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. Order of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the above-described functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

MODE FOR INVENTION

Those skilled in the art will understand that the disclosure may be changed and modified in various ways without departing from the spirit or scope of the disclosure. Accordingly, the disclosure is intended to include changes and modifications of the disclosure provided in the attached claims and an equivalent range thereof.

In this specification, both the apparatus and method inventions have been described, and the descriptions of both the apparatus and method inventions may be complementarily applied.

The various embodiments have been described in the best form for implementing the disclosure.

INDUSTRIAL APPLICABILITY

The disclosure is used in a series of vehicle communication fields.

It is evident to those skilled in the art will understand that the disclosure may be changed and modified in various ways without departing from the spirit or range of the disclosure. Accordingly, the disclosure is intended to include all the changes and modifications provided by the appended claims and equivalents thereof.

The invention claimed is:

1. A secured communication method of a V2X communication device, comprising:
receiving a message based on V2X communication;
extracting adaptive certificate pre-distribution (ACPD) target information based on the message including the ACPD target information, wherein the ACPD target information comprises at least one of a short-term certificate, time information based on a generation time of the ACPD target information, effective time information based on the short-term certificate, predicted location information based on the short-term certificate, and/or predicted time information based on the short-term certificate;
pre-authenticating the short-term certificate; and
transmitting the pre-authenticated short-term certificate,
wherein the message is at least one of a CAM (Cooperative Awareness Message) and/or a DENM (Decentralized Environmental Notification Message),
wherein the V2X communication is DSRC (Dedicated Short-Range Communication),
wherein the short-term certificate relates to a pseudonym certificate (PC) or an authorization ticket (AT), and
wherein the pre-authenticated short-term certificate is broadcasted at the predicted location.

2. The secured communication method of claim 1, further comprising:
collecting at least one pre-authenticated short-term certificate to be broadcasted at the predicted location on a specific time; and
broadcasting an ACPD broadcast message, comprising the collected at least one pre-authenticated short-term certificate, at the predicted location on the specific time.

3. The secured communication method of claim 1, wherein transmitting the pre-authenticated short-term certificate further comprises transmitting the short-term certificate to a transceiver or V2X communication device having a communication range covering the predicted location.

4. The secured communication method of claim 1, wherein the short-term certificate is a short-term certificate to be used at timing based on the predicted time information, which is different from timing of a short-term certificate used in current message communication.

5. The secured communication method of claim 2, wherein the ACPD broadcast message comprises at least one of the at least one pre-authenticated short-term certificate, period information based on a message broadcast period, and/or effective time information.

6. A V2X communication device comprising:
at least one transceiver configured to transmit and receive at least one of a wired signal or a wireless signal;
a processor configured to control the transceiver; and
a memory storing instructions that, when executed by the processor, perform operations comprising:
receiving a message based on V2X communication;
extracting adaptive certificate pre-distribution (ACPD) target information based on the message including the ACPD target information, wherein the ACPD target information comprises at least one of a short-term certificate, time information based on a generation time of the ACPD target information, effective time information based on the short-term certificate, predicted location information based on the short-term certificate is to be used, and/or predicted time information based on the short-term certificate is to be used;
pre-authenticating the short-term certificate; and
transmitting the pre-authenticated short-term certificate, wherein the message is at least one of a CAM (Cooperative Awareness Message) and/or a DENM (Decentralized Environmental Notification Message), wherein the V2X communication is DSRC (Dedicated Short-Range Communication), wherein the short-term certificate relates to a pseudonym certificate (PC) or an authorization ticket (AT), and wherein the pre-authenticated short-term certificate is broadcasted at the predicted location.

7. The V2X communication device of claim 6, wherein the operations further comprise:

collecting at least one pre-authenticated short-term certificate to be broadcasted at the predicted location on a specific time; and broadcasting an ACPD broadcast message, comprising the collected at least one pre-authenticated short-term certificate, at the predicted location on the specific time.

8. The V2X communication device of claim 6, wherein the transmitted pre-authenticated short-term certificate is broadcasted through a transceiver having a communication range covering the predicted location.

9. The V2X communication device of claim 6, wherein the short-term certificate is a short-term certificate to be used at timing based on the predicted time information, which is different from timing of a short-term certificate used in current message communication.

10. The V2X communication device of claim 7, wherein the ACPD broadcast message comprises at least one of the at least one pre-authenticated short-term certificate, period information based on a message broadcast period, or effective time information.

* * * * *